(12) United States Patent
Venugopal et al.

(10) Patent No.: US 11,973,546 B2
(45) Date of Patent: Apr. 30, 2024

(54) SYSTEM AND METHOD FOR DETERMINATION OF METRICS FOR MULTIPLE-INPUT MULTIPLE-OUTPUT COMMUNICATION

(71) Applicant: QUALCOMM Incorporated, San Diego, CA (US)

(72) Inventors: Kiran Venugopal, Raritan, NJ (US); Wooseok Nam, San Diego, CA (US); Yan Zhou, San Diego, CA (US); Tao Luo, San Diego, CA (US); Junyi Li, Chester, NJ (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/125,832

(22) Filed: Dec. 17, 2020

(65) Prior Publication Data

US 2021/0194545 A1 Jun. 24, 2021

Related U.S. Application Data

(60) Provisional application No. 62/951,980, filed on Dec. 20, 2019.

(51) Int. Cl.
*H04B 7/0417* (2017.01)
*H04B 7/0456* (2017.01)
(Continued)

(52) U.S. Cl.
CPC ......... *H04B 7/0417* (2013.01); *H04B 7/0486* (2013.01); *H04B 7/0626* (2013.01);
(Continued)

(58) Field of Classification Search
CPC .. H04B 7/0417; H04B 7/0486; H04B 7/0626; H04B 7/0632; H04B 17/336;
(Continued)

(56) References Cited

U.S. PATENT DOCUMENTS

| 2015/0043450 | A1* | 2/2015 | Ariyavisitakul | ....... H04B 7/024 370/329 |
| 2017/0265155 | A1* | 9/2017 | Kim ..................... H04L 27/2692 |

(Continued)

FOREIGN PATENT DOCUMENTS

WO 2019/183878 A1 10/2019

OTHER PUBLICATIONS

International Search Report & Written Opinion dated Feb. 3, 2021 from corresponding PCT Application No. PCT/US2020/066199.

*Primary Examiner* — Harry H Kim
(74) *Attorney, Agent, or Firm* — Arent Fox LLP/Qualcomm Incorporated

(57) ABSTRACT

In some access networks, group-based beam reporting configured for a UE may be based on heuristics and/or based on UE implementation, and therefore, may lack adequate information regarding joint channel properties for simultaneous transmission and reception on a channel configured with a base station. Configurations of UEs and base stations are described herein that support various feedback metrics for resource grouping in association with transmission and reception operation modes and/or channel states, such as MIMO schemes, SINRs, channel properties, and the like. Base stations may dynamically indicate metrics to be reported by UEs so that simultaneous transmission and reception may be sufficiently supported.

30 Claims, 9 Drawing Sheets

(51) Int. Cl.
- *H04B 7/06* (2006.01)
- *H04B 17/336* (2015.01)
- *H04B 17/391* (2015.01)
- *H04W 56/00* (2009.01)
- *H04W 72/044* (2023.01)
- *H04W 72/23* (2023.01)
- *H04W 72/30* (2023.01)
- *H04W 76/27* (2018.01)
- *H04W 80/02* (2009.01)

(52) U.S. Cl.
CPC ......... *H04B 7/0632* (2013.01); *H04B 17/336* (2015.01); *H04W 56/001* (2013.01); *H04W 72/046* (2013.01); *H04W 72/23* (2023.01); *H04W 72/30* (2023.01); *H04W 76/27* (2018.02); *H04W 80/02* (2013.01)

(58) Field of Classification Search
CPC .... H04B 17/391; H04B 7/0639; H04B 7/063; H04W 56/001; H04W 72/005; H04W 72/042; H04W 72/046; H04W 76/27; H04W 80/02

See application file for complete search history.

(56) References Cited

U.S. PATENT DOCUMENTS

| | | | |
|---|---|---|---|
| 2018/0279287 A1* | 9/2018 | John Wilson | H04W 16/28 |
| 2018/0337764 A1* | 11/2018 | Kwok | H04W 72/21 |
| 2019/0149211 A1* | 5/2019 | Nilsson | H04B 7/0408 |
| | | | 375/267 |
| 2019/0182697 A1* | 6/2019 | Zhang | H04B 7/088 |
| 2019/0297603 A1* | 9/2019 | Guo | H04L 5/0053 |
| 2020/0067583 A1* | 2/2020 | Shin | H04L 5/0053 |
| 2020/0145866 A1* | 5/2020 | Onggosanusi | H04L 5/0048 |

* cited by examiner

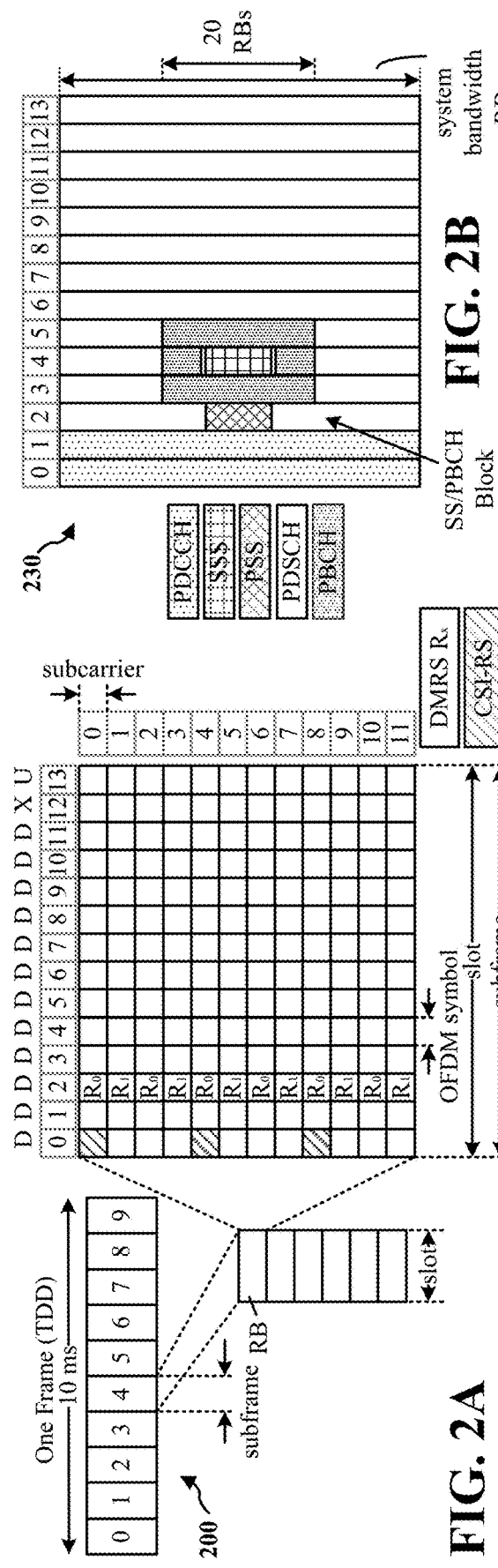
FIG. 2A
FIG. 2B
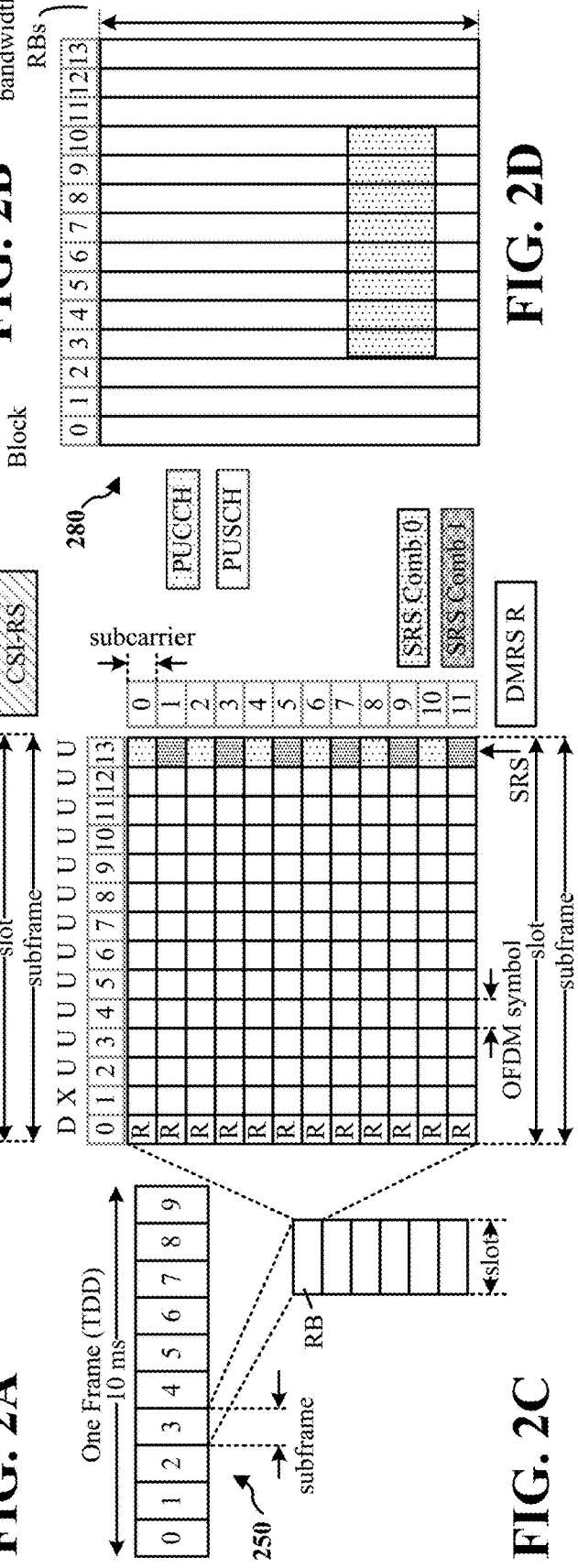
FIG. 2C
FIG. 2D

SYSTEM AND METHOD FOR
DETERMINATION OF METRICS FOR
MULTIPLE-INPUT MULTIPLE-OUTPUT
COMMUNICATION

CROSS REFERENCE TO RELATED
APPLICATION(S)

This application claims the benefit of U.S. Provisional Ser. No. 62/951,980, entitled "SYSTEM AND METHOD FOR DETERMINATION OF METRICS FOR MULTIPLE-INPUT MULTIPLE-OUTPUT COMMUNICATION" and filed on Dec. 20, 2019, the disclosure of which is expressly incorporated by reference herein in its entirety.

BACKGROUND

Technical Field

The present disclosure relates generally to communication systems, and more particularly, to a user equipment configured to report a metric associated with multiple-input multiple-output communication to a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine-type communications (mMTC), and ultra-reliable low-latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to some example access networks, a user equipment (UE) may be configured for group-based beam reporting. When configured for group-based beam reporting, the UE may simultaneously receive two reference and/or synchronization signals on two sets of resources either with a single spatial domain receive filter or with multiple simultaneous spatial domain receive filters. The UE may be configured to report, in one reporting instance, either a reference signal received power (RSRP) or a signal-to-interference-plus-noise ratio (SINR) for each of the two reference and/or synchronization signals in response to receiving the two reference and/or synchronization signals on the two sets of resources.

In such example access networks, however, a procedure for reporting other metrics for reference and/or synchronization signals carried on one or more sets of resources may be absent. For example, some access networks may not support dynamic reporting of other metrics and/or joint quantities of a metric associated with reference and/or synchronization signals carried on simultaneously received sets of resources. Consequently, group-based beam reporting configured for a UE may be based on heuristics and/or based on UE implementation, and therefore, may lack adequate information regarding joint channel properties for simultaneous transmission and reception on a channel configured with a base station. Therefore, a need exists for solutions to reporting metrics related to joint channel properties.

In view of the foregoing, the present disclosure provides some approaches and solutions that support various feedback metrics for resource grouping in association with transmission and reception operation modes and/or channel states, such as multiple-input multiple-output (MIMO) schemes, SINRs, channel properties, and the like.

In one aspect of the disclosure, a first method, a first computer-readable medium, and a first apparatus are provided. The first apparatus may be implemented in a UE. The first apparatus may determine a metric associated with MIMO communication with a base station based on at least one operational state associated with at least one channel configured with the base station. The first apparatus may determine at least one value of the metric based on at least one of a set of signals received from the base station on the at least one channel, the at least one value corresponding to at least one set of resources. Further, the first apparatus may transmit a report indicating the at least one value of the metric to the base station.

In another aspect of the disclosure, a second method, a second computer-readable medium, and a second apparatus are provided. The second apparatus may be implemented in a base station. The second apparatus may determine a metric associated with MIMO communication with a UE based on at least one operational state associated with at least one channel configured with the UE. The second apparatus may transmit information indicating the metric to the UE. The second apparatus may receive, from the UE, a report indicating at least one value of the metric based on at least one of a set of signals transmitted to the UE on the at least one channel, the at least one value corresponding to at least one set of resources.

To the accomplishment of the foregoing and related ends, the one or more aspects comprise the features hereinafter fully described and particularly pointed out in the claims.

The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
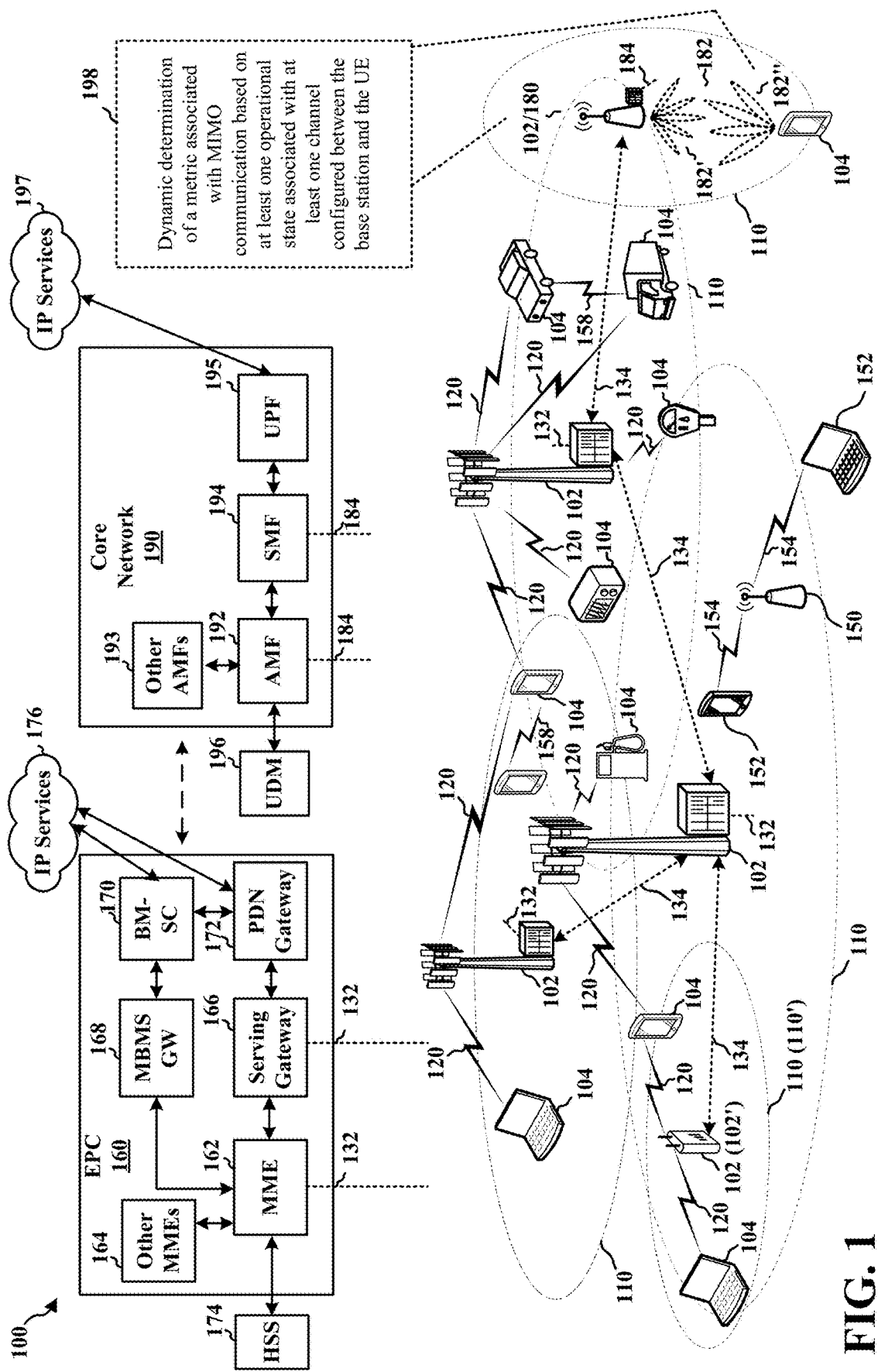
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) streaming service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the base station 102/180 may be configured to transmit each of a set of signals to the UE 104 on at least one channel configured with the UE 104. The UE 104 may receive one or more of the set of signals in one or more of the receive directions 182", as the base station 102/180 transmits each of the set of signals in a respective one of the transmit directions 182'. The set of signals, for example, may include reference signals and/or synchronization signals.

The base station 102/180 may determine a metric associated with MIMO communication with the UE 104 based on at least one operational state associated with the at least one channel configured with the UE 104 (198). The base station 102/180 may transmit information indicating the metric to the UE 104. In one aspect, the base station 102/180 may explicitly indicate this information to the UE 104, e.g., in a reporting configuration that includes a group-based beam report field. In another aspect, the base station 102/180 may configure the at least one operational state of the at least one channel, and the base station 102/180 may implicitly indicate the metric to the UE 104 via the at least one configured operational state.

Correspondingly, the UE 104 may determine a metric associated with the MIMO communication with the base station 102/180 based on at least one operational state associated with the at least one channel configured with the base station 102/180 (198). In one aspect, the UE 104 may determine the metric as indicated in the reporting configuration, which may be based on at least one operational state associated with the at least one channel. In another aspect, the UE 104 may determine the metric based on the operational state associated with the at least one channel as configured by the base station 102/180.

The UE 104 may determine at least one value of the metric based on at least one signal of the set of signals received from the base station 102/180 on the at least one channel. The at least one value may correspond to at least one set of resources. For example, the at least one value may correspond to one or more of spatial resources, time resources, and/or frequency resources. In one aspect, the at least one value may include at least two values, each of which may correspond to at least one set of resources. In another aspect, the at least one value may include one value that corresponds to at least two set of resources.

The UE 104 may transmit a report indicating the at least one value of the metric to the base station 102/180. The base station 102/180 may receive the report and, based on the at least one value of the metric indicated therein, may configure MIMO communication with the UE 104 on the at least one channel. Accordingly, configuration of MIMO communication may be improved through the approaches and solutions described in the present disclosure for dynamically indicating metrics based on operational states of channels between base stations and UEs.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency-division duplexed (FDD) in which for a particular set of subcarriers (carrier system bandwidth), subframes within the set of subcarriers are dedicated for either DL or UL, or may be time-division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information (CSI) reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block, which may be referred to as an SSB. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
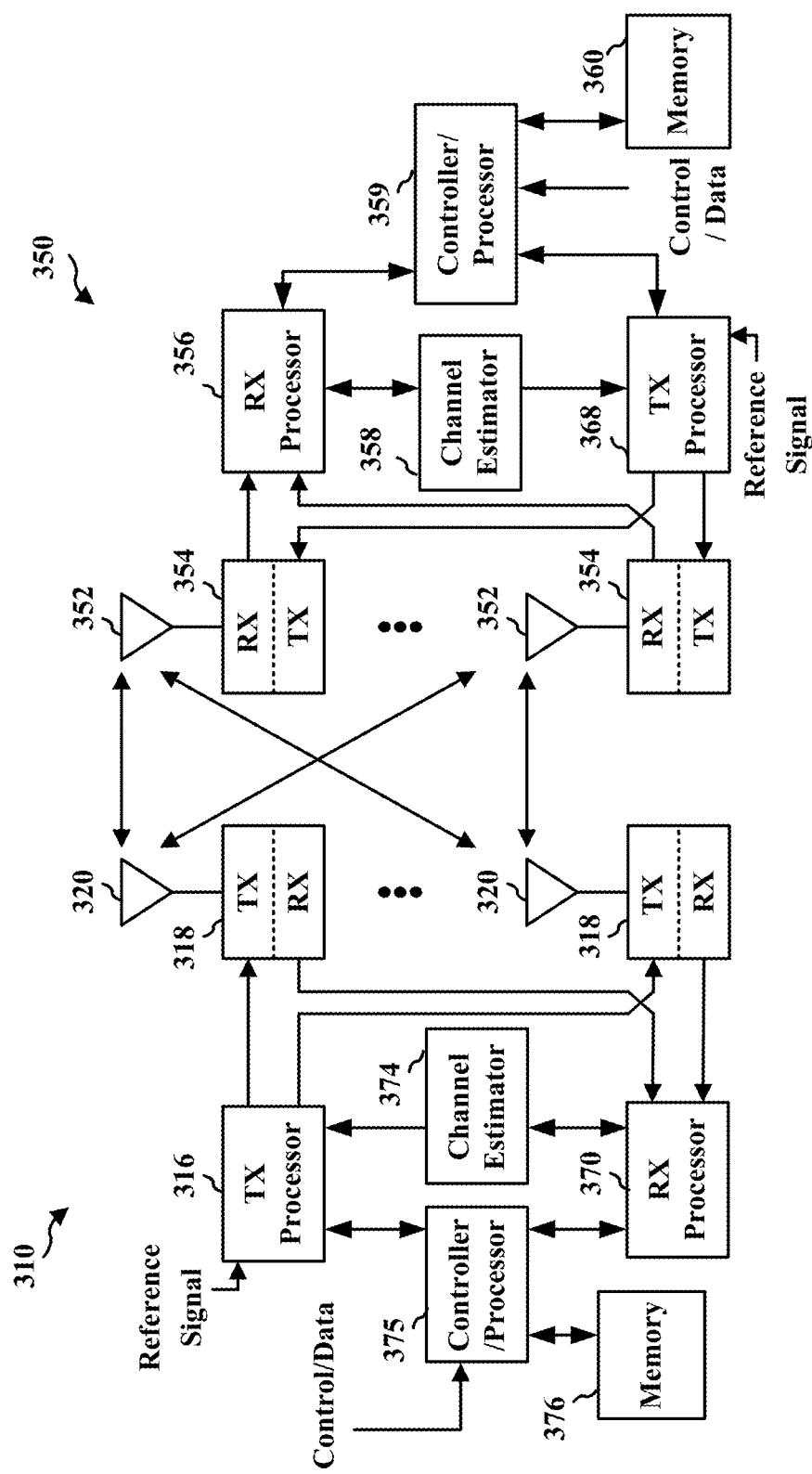
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspect of the present disclosure related to a UE, at least one of the TX processor 368, the RX processor 356, and the controller/processor 359 may be configured to perform aspects in connection with (198) of FIG. 1.

In some other aspects of the present disclosure related to a base station, at least one of the TX processor 316, the RX processor 370, and the controller/processor 375 may be configured to perform aspects in connection with (198) of FIG. 1.

According to various aspects of the present disclosure, a base station and a UE may perform beam management in order to select and adjust beams for communication between the UE and the base station. In downlink beam management, the base station may provide opportunities for the UE to measure beamformed channels of different combinations of Tx beams from the base station and UE Rx beams by transmitting a reference signal with different Tx beams. The base station may provide a beam management configuration to UE. The beam management configuration may include CSI-RS resource configuration, beam report setting, etc. The base station may perform periodic beam sweeping by transmitting a reference signal with different, individual Tx beams. The UE may measure information about a beamformed channel state with different UE Rx beams and may report the measurements to the base station. The UE may report measurement information such as a RSRP, CSI, etc.

After the UE detects the reference signal and performs measurements, the UE may send information about the beams back to the base station. The report may include a CSI report. The UE may use CSI-RSs and/or SSBs to perform measurements for different beams and to provide a CSI report. The SSB is used for initial access and may not require additional overhead for use in beam management. The SSB may have limited bandwidth, whereas CSI-RS may be configured with a different frequency range. The transmission of a CSI-RS for beam management may use additional overhead, yet may enable flexibility in the allocation of resources for the reference signal.

Beam management may be performed on a per beam basis with the UE measuring and reporting for individual beams. Group-based beam reporting may reduce signaling/feedback overhead for beam management for transmission/reception. For example, beam management may be performed and reported for a group of beams rather than for individual beams. Group-based beam management can be performed such that beam tracking and refinement within a group or multiple groups of beams can be supported.

The group-based beam reporting may reduce reporting compared to non-group-based beam reporting. A group-based beam report may include measurement information for a representative beam measured by a UE. The representative beam may be one of the beams in the group of beams or may represent an average of the measurements for the beams in the group. For example, the representative beam may be a beam that has a maximum measurement value compared to other beams in the group. The group-based report may include a reference signal received power (RSRP) for the representative beam and/or a differential RSRP for a different beam in the beam group.

Group-based beam reporting may be based on a report quantity set, RSRP (e.g., CRI-RSRP, SSB-index-RSRP, L1-RSRP, etc.), and/or SINR (e.g., CRI-SINR, SSB-Index-SINR, L1-SINR, etc.). The group-based beam reporting may include a metric, such as RSRP and/or SINR (e.g., CRI-SINR, SSB-Index-SINR, CRI-RSRP, SSB-index-RSRP, L1-RSRP, and/or other metric(s)). For example, the UE may report a largest SINR or largest RSRP (e.g., 7 bits) from the measured reference signals and/or a differential SINR or differential L1-RSRP (e.g., 4 bits) with respect to a largest measured SINR or largest measured RSRP, respectively. In some aspects, the group-based beam reporting might not include other CSI quantities per CSI-RS resource indicator (CRI)/SS/PBCH resource block indicator (SSBRI). The beam-based report may include measurement information for individual beams. The group-based report may have less information about individual beams than the beam-based report.

A base station may configure a UE for L1-SINR based beam report for non-group-based and/or group-based beam reporting. When the base station configures the UE to report an SSBRI and/or a CRI and the corresponding L1-SINR, the report format may include a range and a step size of differential SINR. For example, a differential SINR for a group of N beams, may be determined based on the difference between the measured SINR corresponding to the CRI/SSBRI for the N beams and the measured SINR corresponding to CRI/SSBRI for a beam having the largest SINR among the reported SINRs.

In order to improve link performance and to increase throughput, wireless communication between a base station and a UE may use multi-beam simultaneous transmission and reception. The use of multiple beams may provide macro-diversity as well as higher rates using MIMO techniques. Beam grouping and group-based beam reporting may support simultaneous reception at a UE, e.g., using the same spatial filters or different spatial filters at the receiver.

When a UE is configured to enable group-based beam reporting, the UE can report multiple different CRI/SSBRI per report setting, such as two different CRI/SSBRI per report setting. The CSI-RS and/or SSB resources upon which the CRI/SSBRI are respectively based may be received simultaneously by the UE either with a single beam or with multiple simultaneous beams. The measurement by the UE of the reference signals and the grouping of beams may be used for simultaneous Tx/Rx, e.g., with a joint QCL in a data channel. In some examples, the UE may be configured to simultaneously receive the CSI-RS and/or SSB resources via a single beam or with multiple simultaneous beams.

In some example access networks, however, a procedure for reporting other metrics for reference and/or synchronization signals carried on one or more sets of resources may be absent. For example, some access networks may not support dynamic reporting of other metrics and/or joint quantities of a metric associated with reference and/or synchronization signals carried on simultaneously received sets of resources. Consequently, group-based beam reporting configured for a UE may be based on heuristics and/or based on UE implementation, and therefore, may lack adequate information regarding joint channel properties for simultaneous transmission and reception on a channel configured with a base station. Therefore, a need exists for solutions to reporting metrics related to joint channel properties.

FIGS. 4-7 illustrate some approaches and solutions that support various feedback metrics for resource grouping in association with transmission and reception operation modes and/or channel states, such as MIMO schemes, SINRs, channel properties, and the like. For example, FIGS. 4-7 describe, inter alia, dynamically indicating metrics to be reported by UEs so that simultaneous transmission and reception may be sufficiently supported.

Figure 4:
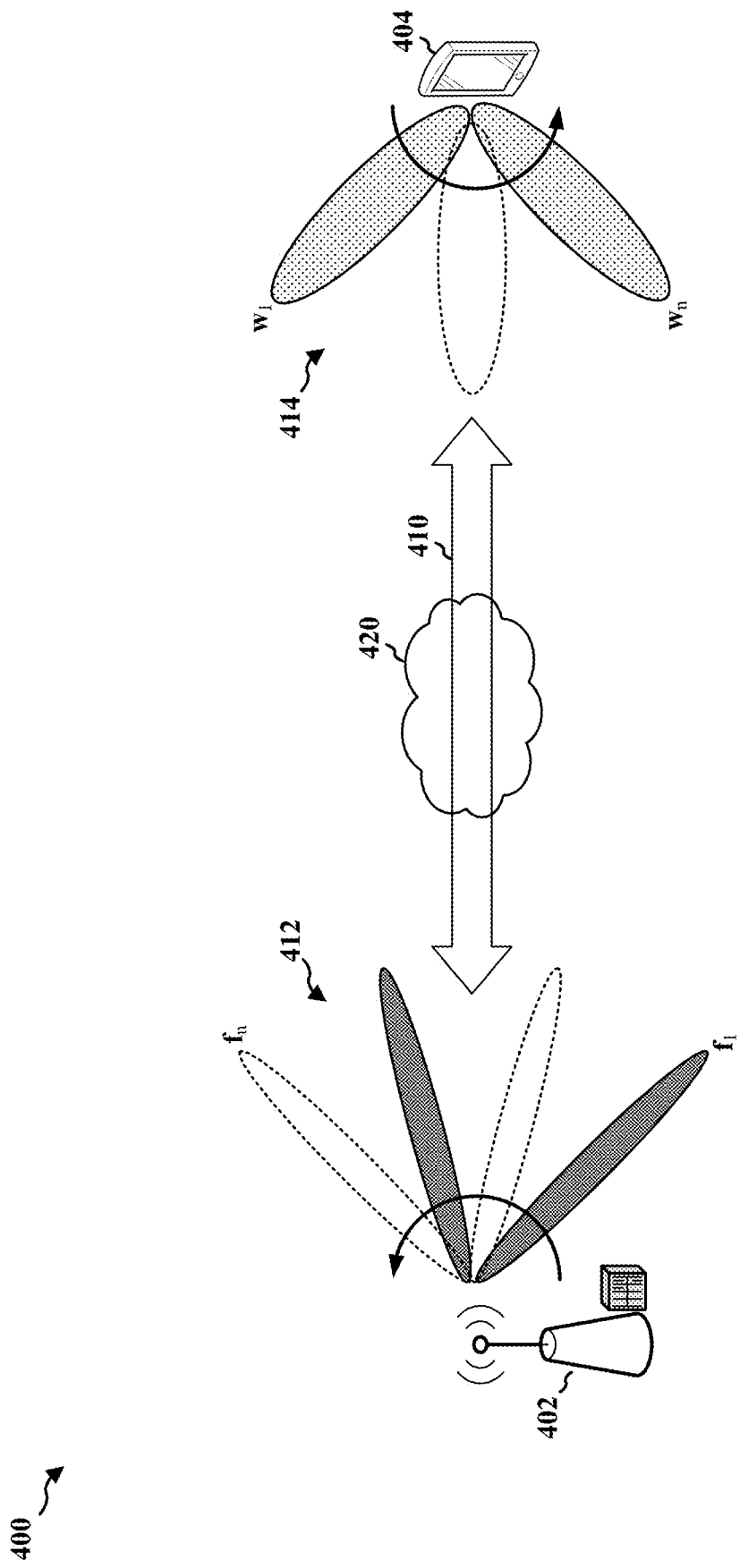
FIG. 4 is a diagram illustrating an example access network including a UE and a base station.

Referring to FIG. 4, an access network 400 may include a base station 402 and a UE 404 configured to communicate on at least one channel 410. In some aspects, the base station 402 and the UE 404 may be configured for mmW/near-mmW communication. With mmW/near-mmW communication, for example, the base station 402 may configure a MIMO scheme with the UE 404. In order to configure MIMO schemes, the base station 402 and the UE 404 may select M beams 412, 414 (e.g., beam pair links) out of N available beams 412, 414 (e.g., beam pair links). Such configurations may rely on beam training and management, e.g., to account for the conditions of the channel 410 on which the base station 402 and the UE 404 communicate.

The base station 402 and the UE 404 may select M beams 412, 414 based on beam training/management and/or channel measurements/feedback (e.g., as described supra). However, the UE 404 may include fewer antenna ports to measure the channel 410 than the number of physical antenna elements of the UE 404. For example, the base station 402 and the UE 404 may transmit and receive, respectively, on the channel 410, represented as H, as an effective channel, represented as $H_{eff}$. The effective channel may be a function of the receiver analog combiner $W_{RF}=[w_1, w_2, \ldots, w_n]$ and the transmitter analog precoder $F_{RF}=[f_1, f_2, \ldots, f_n]$, where each of $W_{RF}$ and $F_{RF}$ may be a matric including beam weights $w_1, w_2, \ldots, w_n$ and $f_1, f_2, \ldots, f_n$, respectively. At a respective PHY layer (e.g., baseband), then, the effective channel may be observed according to Equation 1 (where $W_{RF}^*$ is the conjugate):

$$H_e = W_{RF}^* H F_{RF}$$

As observation on the channel 410 may be limited (e.g., by the number of antenna ports) to observations on the effective channel, the base station 402 and the UE 404 may benefit from an dynamically indicating metrics for resource grouping based on at least one operational state associated with the channel 410. Thus, the base station 402 may dynamically configure the UE 404 with a reporting metric for a group-based beam report based on the at least one operational state of the channel 410. Correspondingly, the UE 404 may measure at least one value for the reporting metric based on signals (e.g., CSI-RSs and/or SSBs) transmitted by the base station 402 with the Tx beams 412 and received by the UE 404 with the Rx beams 414.

The at least one value may correspond to spatial, time, and/or frequency resources, the UE 404 may report the at least one value, for example, as a plurality of values respectively corresponding to a plurality of sets of resources and/or as a single value corresponding to a plurality of sets of resources. In so doing, the UE 404 may capture joint quantities per beam and, when reported to the base station 402, may enable to base station to configure at least one operational state 420—for example, the at least one operational state 420 may include a MIMO scheme, such as a time-division multiplexing (TDM) scheme, frequency-division multiplexing (FDM), and/or spatial division multiplexing (SDM) scheme, and/or a use case, such as enhanced mobile broadband (eMBB), ultra-reliable low-latency communications (URLLC), and/or massive machine-type communications (mMTC).

In some aspects, the at least one operational state 420 may include one or more properties of the channel 410. For example, the at least one operational state 420 may include the noise or interference on the channel 410, blockages on the channel 410 (if any), and/or the capacity of the channel 410.

In some other aspects, the at least one operational state 420 of the channel 410 may include configurations of the channel 410, for example, as configured by the base station 402. For example, the at least one operational state 420 of the channel 410 include a multiplexing scheme and/or MIMO scheme configured on the channel 410, such as TDM, FDM, and/or SDM. In some other examples, the at least one operational state 420 may include spatial domain transmit filters (e.g., at the base station 402) and/or spatial domain receive filters (e.g., at the UE 404) configured to form the links between pairs of beams 412, 414.

In some further examples, the at least one operational state 420 of the channel 410 may include a modulation and coding scheme (MCS) configured by the base station 402 and signaled to the UE 404. In some additional example, the at least one operational state 420 of the channel 410 may include a use case, such as eMBB, URLLC, and/or mMTC.

The base station 402 may determine the at least one operational state 420 of the channel 410. For example, the base station 402 may determine one or more of an operational signal-to-noise ratio (SNR) and/or SINR associated with a link between a pair of beams 412, 414, an effective SNR and/or SINR associated with the channel 410, an operational RSRP associated with a link between a pair of beams 412, 414, an effective RSRP associated with the channel 410, one or more spatial properties of the channel 410, a link or channel model, a link or channel capacity, mutual information, and/or a multiplexing scheme configured for the channel 410.

By way of illustration, an operational SNR and/or SINR may include an SNR and/or SINR, respectively, measured from at least one of a set of signals received on the channel 410 and/or via a pair of beams 412, 414. An operational SNR and/or SINR may be based on information (e.g., received in a report) indicating SNR and/or SINR measurement(s) from at least one of a set of signals received on the channel 410 and/or via a pair of beams 412, 414. In some aspects, an operational SNR and/or SINR may be based on an individual beam pair link—e.g., one of the beams 412 of the base station 402 paired with one of the beams 414 of the UE 404. An effective SNR and/or SINR, however, may be based on at least two beam pair links, which may be configured as a joint channel; for example, an effective SNR and/or SINR may be based on at least two of the beams 412 of the base station 402 respectively paired with at least two of the beams 414 of the UE 404. In some additional and/or alternative aspects, an effective SNR and/or SINR may be based on information (e.g., received in a report) indicating SNR and/or SINR measurement(s) from at least one of a set of signals received on the channel 410 and/or via a pair of beams 412, 414, and additionally, may be based on other information associated with the quality of communication on the channel 410 and/or via a pair of beams 412, 414, such as a link quality indicator (LQI) and/or other information indicative of communication quality on the channel 410 and/or via a pair of beams 412, 414. For example, the effective SNR and/or SINR may include information that is based on a combination of SNR and/or SINR measurement(s) and information associated with the quality of communication on the channel 410 and/or via a pair of beams 412, 414, such as an LQI.

Similarly, an operational RSRP may be based on information (e.g., received in a report) indicating RSRP measurement(s) from at least one of a set of signals received on the channel 410 and/or via a pair of beams 412, 414. In some aspects, an operational RSRP may be based on an individual beam pair link—e.g., one of the beams 412 of the base station 402 paired with one of the beams 414 of the UE 404. An effective RSRP, however, may be based on at least two beam pair links, which may be configured as a joint channel; for example, an effective RSRP may be based on at least two of the beams 412 of the base station 402 respectively paired with at least two of the beams 414 of the UE 404. In some additional and/or alternative aspects, an effective RSRP may be based on information (e.g., received in a report) indicating RSRP measurement(s) from at least one of a set of signals received on the channel 410 and/or via a pair of beams 412, 414, and additionally, may be based on other information associated with the quality of communication on the channel 410 and/or via a pair of beams 412, 414, such as an LQI and/or other information indicative of communication quality on the channel 410 and/or via a pair of beams 412, 414. For example, the effective RSRP may include information that is based on a combination of RSRP measurement(s) and information associated with the quality of communication on the channel 410 and/or via a pair of beams 412, 414, such as an LQI.

According to various additional illustrative examples, one or more spatial properties of the channel 410 may include signal gain, signal power, angle of arrival of a signal, fading, angular spread, and/or one or more other spatial properties associated with the channel 410. A link or channel model may include information simulating wireless propagation (e.g., with spatial diversity and/or polarization) associated with the channel 410, information indicating one or more blockages associated with the channel 410 and/or the environments of the base station 402 and/or the UE 404 (e.g., affecting communication on the channel 410), and/or other information that may model the channel 410. A link or channel capacity may include information indicating the capacity of the channel 410, such as a rate (e.g., an upper bound) at which information can be reliably communicated on the channel 410. Mutual information may include information (e.g., parameters, schemes, etc.) agreed upon and/or acknowledged between the base station 402 and the UE 404, such as a mutual information associated with modulated symbols and/or coded bits, mutual information associated with SNR and/or SINR, and/or mutual information associated with a block error rate (BLER) of communication on the channel 410. A multiplexing scheme may include a configuration, e.g., by the base station 102/180, for multiplexing (e.g., time, frequency, and/or spatial) of information communicated on the channel 410.

In some aspects, the base station 402 may determine the at least one operational state 420 based on measurements and/or other information received from the UE 404, such as an SNR, SINR, RSRP, LQI, and/or one or more other measurements and/or other information. For example, the UE 404 may transmit one or more reports indicating the measurements and/or other information, such as one or more CSI reports, which may be received by the base station 402. In some other aspects, the base station 402 may determine the at least one operational state 420 based on measurements and/or other information determined (e.g., performed) by the base station 402. In still further aspects, the base station 402 may determine the at least one operational state 420 when the base station 402 configures the channel 410, such as when the base station 402 configures a multiplexing scheme on the channel.

Figure 5:
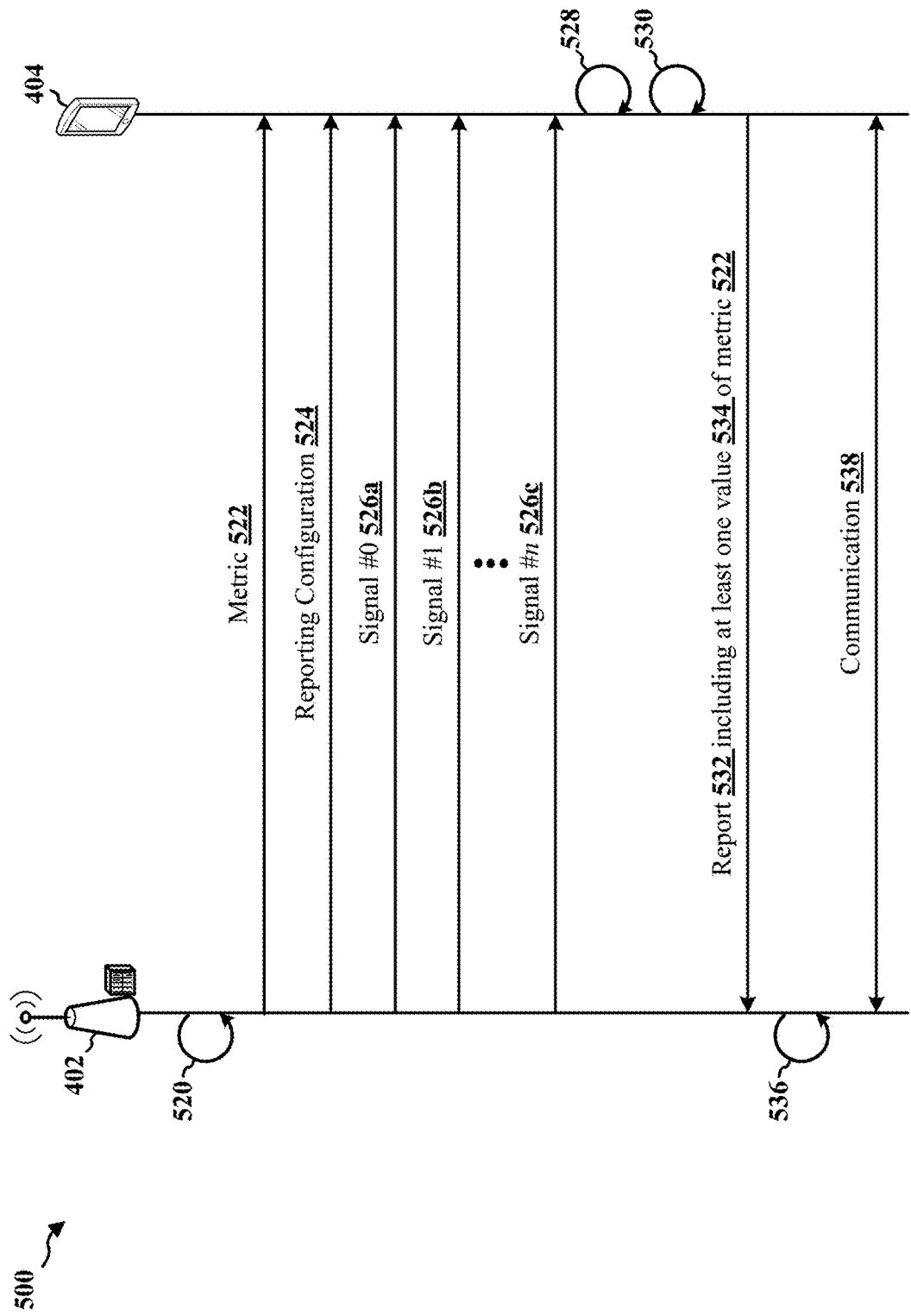
FIG. 5 is a call flow diagram illustrating example operations by the UE and the base station in the access network.

FIG. 5 illustrates example operations 500 in the access network 400 that includes the base station 402 and the UE 404. As described, supra, the base station 402 and the UE 404 may communicate on the channel 410, and the channel 410 may be associated with at least one operational state 420. The at least one operational state 420 may be associated with one or more beam pair links configured between beams 412 of the base station 402 and corresponding beams 414 of the UE 404.

Based on the at least one operational state 420 associated with the channel 410 configured with the UE 404, the base station 402 may determine 520 a metric 522 associated with MIMO communication with the UE 404. The base station 402 may determine the metric 522 to include at least one of a CQI, a PMI, and/or an RI, e.g., for one or more sets of resources.

In some aspects, the base station 402 may determine 520 the metric 522 as that which best represents multiple streams and/or beam pairs based on which a MIMO scheme can be configured. Thus, in determining 520 the metric 522, the base station 402 may determine at least one set of resources to be reported for the metric 522. For example, the base station 402 may determine a quantity of sets of resources to be reported for the metric 522 that represent diversity on the channel 410 in order to improve communication on the channel 410 through macro-diversity and/or MIMO schemes, such as a quantity of sets of resources that represent joint properties of different sets of resources on the channel. The one or more sets of resources may be spatial, time, and/or frequency resources.

The base station 402 may transmit information indicating the metric 522 to the UE 404. The information indicating the metric 522 may indicate the one or more sets of resources to be reported for the metric 522, such as a quantity of joint sets of resources that represent joint properties associated with the channel 410. According to various aspects, the base station 402 may explicitly indicate the information indicating the metric 522 to the UE 404 or may implicitly indicate the information indicating the metric 522 to the UE 404.

In order to explicitly indicate the metric 522 to the UE 404, the base station 402 may transmit the information indicating the metric 522 to the UE 404 via one of RRC signaling, a MAC control element (CE), and/or in DCI. In one aspect, the base station 402 may include the information indicating the metric 522 in a reporting configuration 524, which the base station 402 may transmit to the UE 404. The reporting configuration 524 may be a CSI reporting configuration, and the base station 402 may include the metric 522 in a field associated with a group-based beam reporting.

In order to implicitly indicate the metric 522 to the UE 404, the base station 402 may configure at least one operational state 420 of the channel 410 to indicate the metric 522. According to some aspects, the base station 402 may configure one multiplexing scheme of a plurality of different multiplexing schemes (e.g., TDM, FDM, and/or SDM) for communication with the UE 404 on the channel 410, and the configured multiplexing scheme may implicitly indicate the metric 522 to the UE 404. For example, when the base station 402 configures an SDM multiplexing scheme on the channel 410, the base station 402 may be implicitly indicating that reporting for the metric 522 should be on one or more sets of spatial resources corresponding to links formed between pairs of the beams 412, 414.

In some aspects, the base station 402 may dynamically transmit information to the UE 404 that overrides or reconfigures the UE 404 from a previous reporting configuration. For example, the base station 402 may transmit a reporting configuration to the UE 404 that indicates a metric and at least one set of resources (e.g., a measurement set) and, subsequently, the base station 402 may transmit information to the UE 404 that explicitly or implicitly indicates the metric 522 or the at least one set of resources. Thus, one of the metric or the at least one set of resources indicated in the previous reporting configuration may still be valid for the UE 404, but the other of the metric or the at least one set of resources may be reconfigured by the base station 402 for the UE 404.

In addition to transmitting the information indicating the metric 522, the base station 402 may transmit (e.g., periodically transmit) one or more sets of signals 526a-c to the UE 404. According to various aspects, the signals 526a-c may be reference signals (e.g., CSI-RSs) and/or synchronization signals (e.g., SSBs). Potentially, the base station 402 may transmit each of the signals 526a-c with a respective one of the beams 412 of the base station 402. The UE 404 may receive the signals 526a-c, e.g., with a corresponding one of the beams 414 of the UE 404 forming a respective beam pair link between the base station 402 and the UE 404.

Similar to the base station 402, the UE 404 may determine the at least one operational state 420 of the channel 410. For example, the UE 404 may determine one or more of an operational SNR and/or SINR associated with a link between a pair of beams 412, 414, an effective SNR and/or SINR associated with the channel 410, an operational RSRP associated with a link between a pair of beams 412, 414, an effective RSRP associated with the channel 410, one or more spatial properties of the channel 410, a link or channel model (e.g., indicating one or more blockages, the environments of the base station 402 and/or the UE 404, and the like), a link or channel capacity, mutual information, and/or a multiplexing scheme configured for the channel 410.

In some aspects, the UE 404 may determine the at least one operational state 420 based on performing measurements based on signals (e.g., reference and/or synchronization signals) received from the base station 402. In some other aspects, the UE 404 may determine the at least one operational state 420 based on information received from the base station 402. For example, the base station 402 may configure the channel 410, such as by configuring a multiplexing scheme on the channel 410. The base station 402 may then transmit information indicating the channel configuration to the UE 404, which may implicitly indicate the metric 522.

Based on the at least one operational state 420 determined by the UE 404, the UE 404 may determine 528 the metric 522 associated with MIMO communication with the base station 402. When the base station 402 implicitly indicates the metric 522 to the UE 404, the UE 404 may determine 528 the metric 522 by determining the at least one operational state 420 of the channel 410. For example, the UE 404 may determine the multiplexing scheme configured for the channel 410 is FDM, and the UE 404 may determine that the base station 402 is implicitly indicating joint sets of frequency resources to be reported for the metric 522.

Alternatively, when the base station 402 explicitly indicates the metric 522 to the UE 404, the UE 404 may receive the information indicating the metric 522 via one of RRC signaling, a MAC CE, and/or DCI. In one aspect, the UE 404 may receive the reporting configuration 524 from the base station 402, and the reporting configuration 524 may include information indicating the metric 522, as determined by the base station 402 based on the at least one operational state 420 of the channel 410. The UE 404 may determine 528 the metric 522, as well as the one or more sets of resources (e.g., joint sets of resources), from the (explicit) indication transmitted by the base station 402, as determined based on the at least one operational state 420 of the channel 410. In some aspects, the UE 404 may determine 528 that the metric 522 overrides another metric received in a previously received reporting configuration.

Subsequently, the UE 404 may determine 530 at least one value 534 of the metric 522 based on one or more of the signals 526a-c (e.g., CSI-RSs and/or SSBs) received from the base station 402 on the channel 410. The UE 404 may receive the signals 526a-c on sets of resources with a single one of the Rx beams 414 or with multiple ones of the Rx beams 414. For example, the UE 404 may simultaneously receive CSI-RS and/or SSB resources with either a single spatial domain receive filter or with multiple simultaneous spatial domain receive filters. Accordingly, the UE 404 may determine 530 the at least one value 534 respectively corresponding to one or more sets of resources carrying one or more of the signals 526a-c.

In one example, the UE 404 may determine 530 the at least one value 534 by calculating a PMI or RI CQI based on maximizing the mutual information between transmitted and received symbols, e.g., using at least two sets of resources. In another example, the UE 404 may determine 530 the at least one value 534 by calculating a CQI based on measuring SNRs, SINRs, and/or signal-to-noise-plus-distortion ratios (SNDRs) using at least two of the signals 526a-c carried on at least two different sets of resources, e.g., in order to derive a CQI for multiple streams. In a further example, the UE 404 may determine 530 the at least one value 534 by calculating mutual information for a group of links formed between pairs of beams 412, 414.

As the base station 402 may indicate the sets of resources to be used by the UE 404 for determining the at least one value 534, the UE 404 may determine 530 the at least one value 534 based on those sets of resources indicated by the base station 402. For example, the UE 404 may determine at least two values each corresponding to at least one set of resources and/or the UE 404 may determine a single value corresponding to at least two different sets of resources—for example, the UE 404 may determine a joint CQI over at least two different sets of resources.

Alternatively, the UE 404 may determine 530 the at least one value 534 over different sets of resources than those indicated by the base station 402. For example, the UE 404 may determine 530 the at least one value 534 using a single set of resources when the base station 402 has indicated a joint set of resources for the metric 522. In another example, the UE 404 may determine 530 the at least one value 534 using fewer or greater sets of resources than indicated by the base station 402 for the metric 522. In other words, the UE 404 potentially may determine a quantity for the at least one value 534 of the metric 522 that is different from the quantity of sets of resources signaled by the base station 402 in the information indicating the metric 522.

By way of illustration, the UE 404 may determine that the effective and/or operational SNR on the channel 410 is relatively good (e.g., satisfies or meets/exceeds a threshold), and so the UE 404 may determine at least one value 534 of the metric 522 over sets of resources that represent diversity on the channel 410 in order to improve communication on the channel 410 through macro-diversity and/or MIMO schemes. Such a value may represent joint channel properties related to MIMO communication. Conversely, the UE 404 may determine that the effective and/or operational SNR on the channel 410 is relatively poor (e.g., does not satisfy or fails to meet/exceed a threshold), and so the UE 404 may determine at least one value 534 of the metric 522 on a single set of resources in order to maximize the performance of one link between one pair of beams 412, 414. Thus, the UE 404 may independently indicate at least one value 534 of the metric 522 that corresponds to a quantity of sets of resources that is suitable for the at least one operational state 420 of the channel 410, e.g., in order to prevent the base station 402 from configuring communication on the channel 410 that wastes time and power transmitting in multiple different directions when channel conditions are poor and power should be concentrated on one link between the beams 412, 414.

The UE 404 may then transmit the at least one value 534 of the metric 522 to the base station 402. In some aspects, the UE 404 may transmit two different values of the at least one value 534 corresponding to at least two sets of resources on which at least two of the signals 526a-c are received. Alternatively or additionally, the UE 404 may transmit one value of the at least one value 534 corresponding to at least two sets of resources on which at least two of the signals 526a-c are received.

The UE 404 may include the at least one value 534 of the metric 522 in a report 532. The report 532 may be, for example, a CSI report. In some aspects, the UE 404 may transmit the report 532 in a configured reporting instance and/or on at least one configured reporting resource, such as at least one spatial resource (e.g., a configured beam or transmission configuration indicator (TCI) state), time resource, and/or frequency resource.

The base station 402 may receive the report 532 including the at least one value 534 of the metric 522. Based on the at least one value 534 of the metric 522, the base station 402 may configure 536 a communication mode on the channel 410, such as by configuring an analog precoder based on the at least one value 534 of the metric 522. For example, the base station 402 may configure a MIMO scheme or multiplexing scheme on the channel 410 for communication with the UE 404. Illustratively, the base station 402 may configure FDM, TDM, and/or SDM on one or more streams based on the at least one value 534 of the metric 522.

In some aspects, the base station 402 may configure 536 a communication mode on the channel 410 based on a preferred mode of the UE 404, which may be indicated by the UE 404 through the at least one value 534 of the metric 522. For example, when the at least one value 534 of the metric 522 correspond to a different quantity than that indicated by the base station 402, which may indicate a different MIMO or multiplexing scheme than that configured by the base station 402. Potentially, the UE 404 may indicate a preferred mode of single-input single-output (SISO) communication when at least one operational state 420 of the channel 410 is relatively poor.

The base station 402 may transmit information indicated the configured communication mode to the UE 404. The UE 404 may receive the information indicating the configured communication mode from the base station 402, and may configure one or more layers of the UE 404 according to the indicated communication mode. For example, the UE 404 may configure an analog combiner (e.g., at a PHY layer) in response to receiving the configured communication mode from the base station 402. The base station 402 and the UE 404 may then communicate 538 according to the configured communication mode.

Figure 6:
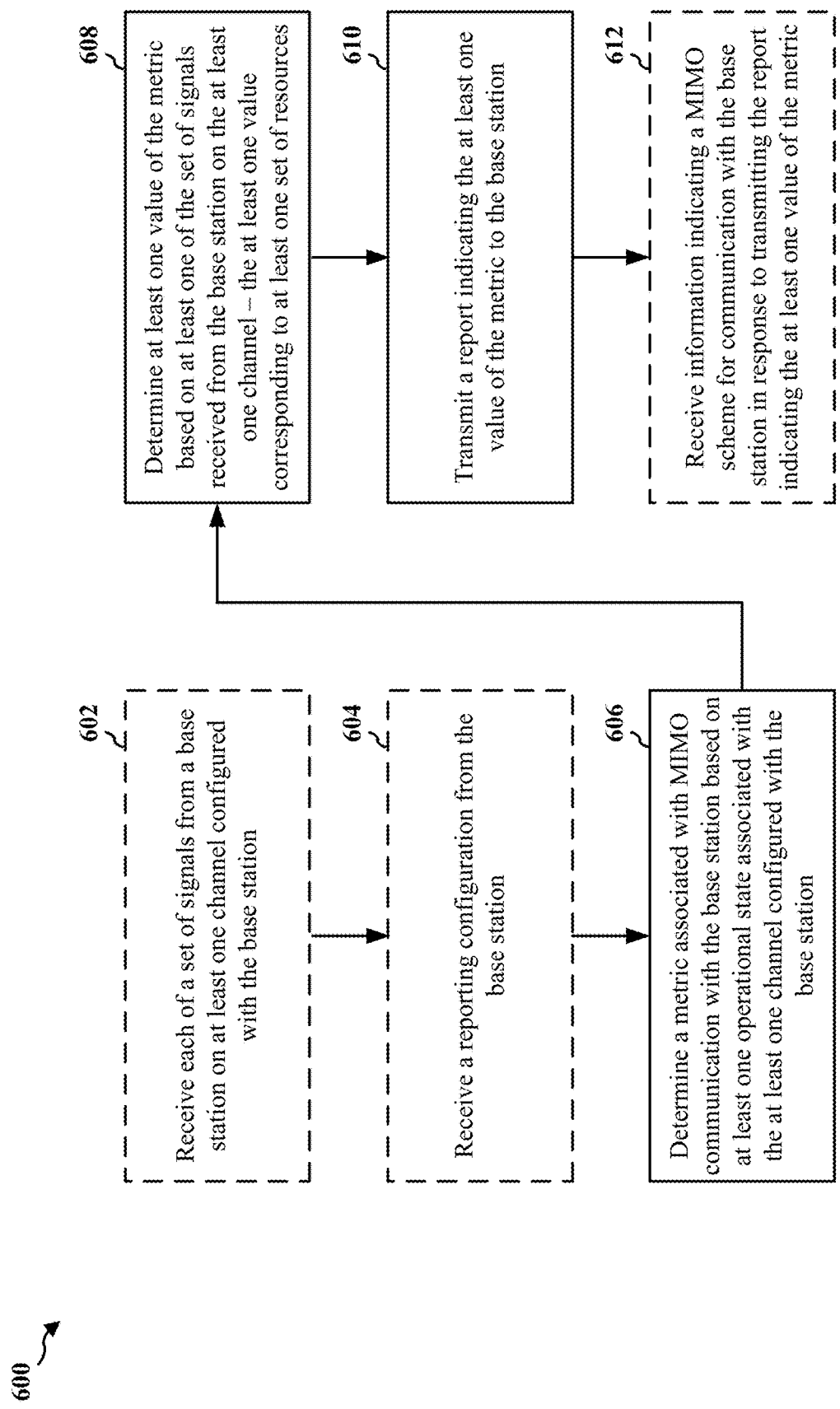
FIG. 6 is a flowchart of a method of wireless communication by a UE.

FIG. 6 is a flowchart of a method 600 of wireless communication. The method 600 may be performed by a UE (e.g., the UE 104, 350, 404, which may include the memory 360 and which may be the entire UE 104, 350, 404 or a component of the UE 104, 350, 404, such as the TX processor 368, the RX processor 356, and/or the controller/processor 359) and/or an apparatus (e.g., the apparatus 802). According to various aspects, one or more of the illustrated operations may be transposed, omitted, and/or contemporaneously performed.

At 602, the UE may receive each of a set of signals from a base station on at least one channel configured with the base station. Each of the set of signals may be a CSI-RS and/or an SSB. The UE may receive the signals on sets of resources with a single Rx beam of the UE or with multiple Rx beams of the UE. For example, the UE may simultaneously receive resources with either a single spatial domain receive filter or with multiple simultaneous spatial domain receive filters. For example, referring to FIGS. 4-5, the UE 404 may receive the signals 526a-c from the base station 402 on sets of resources with a single one of the Rx beams 414 or using multiple ones of the Rx beams 414. According to various aspects, the UE 404 may simultaneously receive CSI-RS and/or SSB resources with either a single spatial domain receive filter or with multiple simultaneous spatial domain receive filters.

At 604, the UE may receive a reporting configuration from the base station. For example, the UE may receive the reporting configuration via one of RRC signaling, a MAC CE, or DCI. The reporting configuration may indicate a metric associated with MIMO communication on the channel, such as a PMI, RI, and/or CQI. Further, the reporting configuration may indicate at least one set of resources on which the UE is to report. In one aspect, the reporting configuration may be a CSI reporting configuration, and may include a group-based beam field that indicates the metric. For example, referring to FIGS. 4-5, the UE 404 may receive the reporting configuration 524 from the base station 402, which may indicate the metric 522.

At 606, the UE may determine a metric associated with MIMO communication with the base station based on at least one operational state associated with the at least one channel configured with the base station. According to various aspects, the metric may be an RI, PMI, and/or CQI. The metric may be associated with a quantity of sets of resources, such as spatial resources, time resources, and/or frequency resources. For example, the UE may determine that the metric includes a CQI over a plurality of beams or spatial filters.

The at least one operational state of the channel may include channel properties (e.g., channel conditions) and/or channel configurations (e.g., a multiplexing scheme configured by the base station on the channel). According to various aspects, the at least one operational state may be one or more of an operational SNR and/or SINR associated with a link between a pair of beams, an effective SNR and/or SINR associated with the channel, an operational RSRP associated with a link between a pair of beams, an effective RSRP associated with the channel, one or more spatial properties of the channel, a link or channel model (e.g., indicating one or more blockages, the environments of the base station and/or the UE, and the like), a link or channel capacity, mutual information, and/or a multiplexing scheme configured for the channel.

In some aspects, the base station may implicitly indicate the metric to the UE via the operational state of the channel, and therefore, the UE may determine the metric that corresponds to at least one operational state of the channel configured by the base station, such as by determining a multiplexing scheme configured by the base station for the channel.

In some other aspects, the base station may explicitly indicate the metric to the UE, and the metric may have been determined by the base station based on at least one operational state of the channel. For example, the UE may receive a reporting configuration that indicates at least one of the metric or the at least one set of resources corresponding to at least one value of the metric. In another example, the UE may receive information indicating the metric via at least one of RRC signaling, a MAC CE, and/or DCI. In still other aspects, the UE may explicitly or implicitly receive information from the base station that the reconfigures the UE with at least one of a metric or a set of resources that is different from that indicated in a previously received reporting configuration. For example, the UE may receive signaling from the base station that indicates a different metric from that indicated in the reporting configuration, but the at least one set of resources may still remain valid for reporting by the UE.

For example, referring to FIGS. 4-5, the UE 404 may determine 528 the metric 522 associated with MIMO communication with the base station 402 based on the at least one operational state 420 associated with the channel 410 configured with the base station 402. In one aspect, the UE 404 may determine 528 the metric 522 based on information received from the base station 402 that explicitly indicates the metric 522. For example, the UE 404 may receive the reporting configuration 524, which may include information indicating the metric 522, as determined by the base station 402 based on the at least one operational state 420 of the channel 410. In another aspect, the UE 404 may determine 528 the metric 522 based on information received from the base station 402 that implicitly indicates the metric 522. For example, the UE 404 may determine the at least one operational state 420 of the channel 410, and the determined at least one operational state 420 may correspond to the metric 522.

At 608, the UE may determine at least one value of the metric based on at least one signal of the set of signals received from the base station on the channel. The at least one value may correspond to at least one set of resources, such as time, frequency, and/or spatial resources. The UE may determine the at least one value for a quantity, which may be indicated to the UE by the base station and/or may be determined by the UE (e.g., based on the at least one operational state). In one aspect, the UE may determine the at least one value as at least two values, and each of the at least two values may correspond to a respective set of resources. In another aspect, the UE may determine the at least one value as a single value that corresponds to at least two sets of resources.

For example, referring to FIGS. 4-5, the UE 404 may determine 530 the at least one value 534 based on at least one of the signals 526a-c received from the base station 402 on the channel 410. In one aspect, the UE 404 may determine 530 the at least one value 534 as at least two values based on at least two of the signals 526a-c received from the base station 402 on the channel 410, and each of the at least two values may correspond to a respective set of resources on which a respective one of the at least two of the signals 526a-c is received. In another aspect, the UE 404 may determine 530 the at least one value 534 as one value based on at least two of the signals 526a-c received from the base station 402 on the channel 410—e.g., the at least one value 534 may be one value capturing the joint properties of at least two different sets of resources.

At 610, the UE may transmit a report indicating the at least one value of the metric to the base station. For example, the UE may include the at least one value of the metric in a CSI report. In some aspects, the UE may transmit the report in a configured reporting instance and/or on at least one configured reporting resource, such as at least one spatial resource (e.g., a configured beam or TCI state), time resource, and/or frequency resource. For example, referring to FIGS. 4-5, The UE 404 may transmit the at least one value 534 of the metric 522 to the base station 402 in the report 532.

At 612, the UE may receive information indicating a MIMO scheme for communication with the base station in response to transmitting the report indicating the at least one value of the metric. For example, the UE may receive information indicating a TDM, FDM, and/or SDM scheme configured on the channel for MIMO communication with the base station. The UE may communicate with the base station (e.g., receive downlink data and/or control information from the base station) based on the information indicating the MIMO scheme. For example, referring to FIGS. 4-5, the UE 404 may receive information from the base station 402 that indicates a MIMO scheme for MIMO communication 538 on the channel 410.

Figure 7:
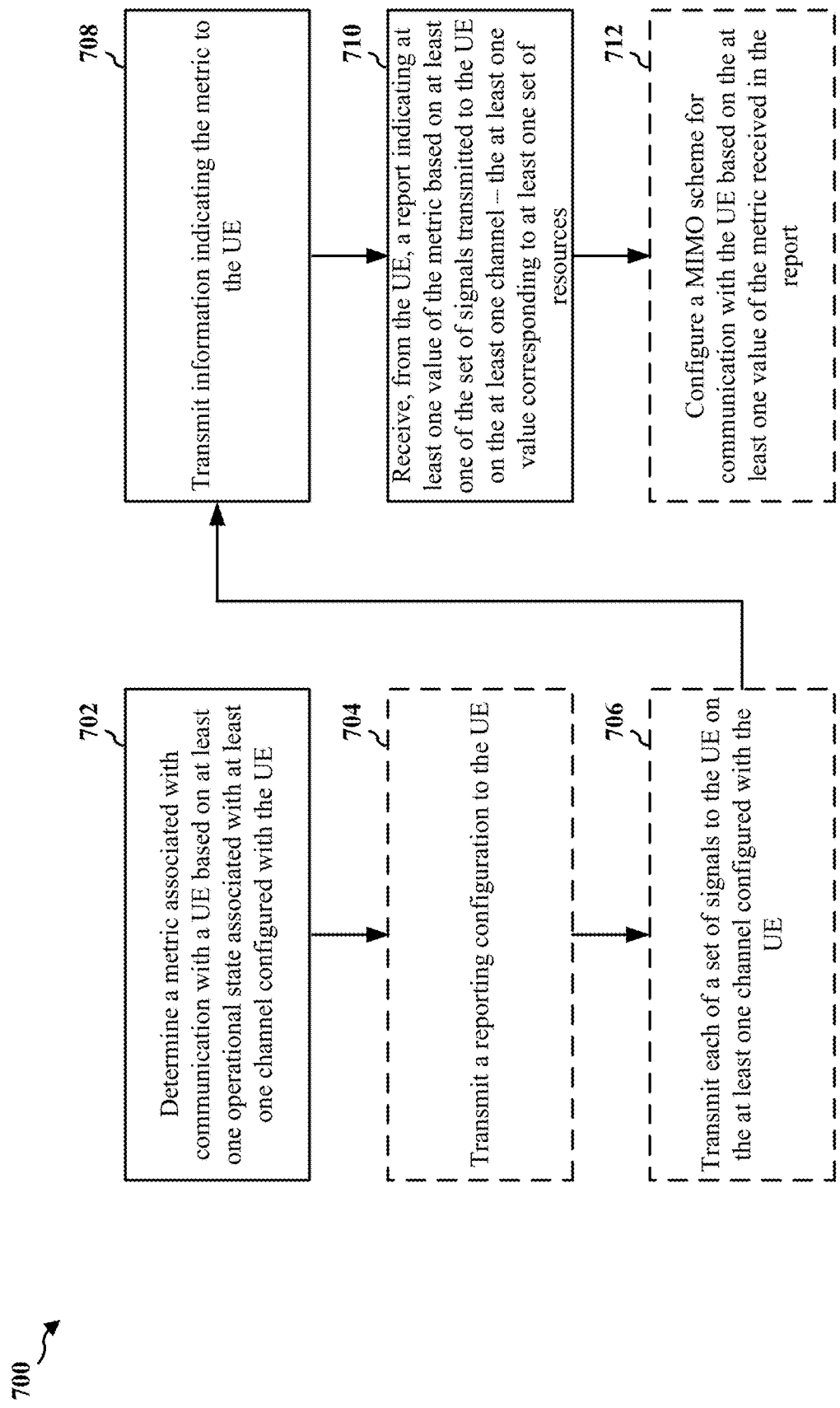
FIG. 7 is a flowchart of a method of wireless communication by a base station.

FIG. 7 is a flowchart of a method 700 of wireless communication. The method 700 may be performed by a base station (e.g., the base station 102/180, 310, 402, which may include the memory 376 and which may be the entire base station 102/180, 310, 402 or a component of the base station 102/180, 310, 402, such as the TX processor 316, the RX processor 370, and/or the controller/processor 375) and/or an apparatus (e.g., the apparatus 902). According to various aspects, one or more of the illustrated operations may be transposed, omitted, and/or contemporaneously performed.

At 702, the base station may determine a metric associated with MIMO communication with a UE based on at least one operational state associated with at least one channel configured with the UE. According to various aspects, the metric may be an RI, PMI, and/or CQI. The metric may be associated with a quantity of sets of resources, such as spatial resources, time resources, and/or frequency resources. For example, the base station may determine that the metric includes a CQI over a plurality of beams or spatial filters.

The at least one operational state of the channel may include channel properties (e.g., channel conditions) and/or channel configurations (e.g., a multiplexing scheme configured by the base station on the channel). According to various aspects, the at least one operational state may be one or more of an operational SNR and/or SINR associated with a link between a pair of beams, an effective SNR and/or SINR associated with the channel, an operational RSRP associated with a link between a pair of beams, an effective RSRP associated with the channel, one or more spatial properties of the channel, a link or channel model (e.g., indicating one or more blockages, the environments of the base station and/or the UE, and the like), a link or channel capacity, mutual information, and/or a multiplexing scheme configured for the channel.

For example, referring to FIGS. 4-5, the base station 402 may determine 520 the metric 522 associated with MIMO communication with the UE 404 based on the at least one operational state 420 associated with the channel 410 configured with the UE 404.

At 704, the base station may transmit a reporting configuration to the UE. According to various aspects, the reporting configuration may indicate at least one of the metric and/or at least one set of resources. Potentially, the at least one set of resources may be associated with the metric. In some aspects, the reporting configuration may be associated with CSI reporting by the UE—for example, the reporting configuration may configure the UE with a type, contents, and/or periodicity associated with one or more CSI reports to be transmitted by the UE to the base station. For example, referring to FIGS. 4-5, the base station 402 may transmit the reporting configuration 524 to the UE 404 on one or more sets of resources. The reporting configuration 524 may be a CSI reporting configuration, and the base station 402 may include the metric 522 in a field associated with a group-based beam reporting.

At 706, the base station may transmit each of a set of signals to a UE on at least one channel configured with the UE. Each of the set of signals may be a CSI-RS and/or an SSB. The base station may transmit the signals on sets of resources with a Tx beams of the base station, which may be paired with corresponding Rx beams of the UE. For example, referring to FIGS. 4-5, the base station 402 may transmit the signals 526a-c to the UE 404 on sets of resources. Each of the signals 526a-c may be transmitted with a respective one of the Tx beams 412, which may be paired with a corresponding one of the Rx beams 414 of the UE 404.

At 708, the base station may transmit information indicating the metric to the UE. In some aspects, the base station may implicitly indicate the metric to the UE via the operational state of the channel. For example, the base station may configure at least one operational state (e.g., multiplexing scheme) of the channel, and the metric may correspond to at least one operational state of the channel configured by the base station. In some other aspects, the base station may explicitly indicate the metric to the UE in the reporting configuration, which may include information indicating a quantity of sets of resources on which at least one value of the metric is to be based. In one aspect, the reporting configuration may be a CSI reporting configuration, and may include a group-based beam field that indicates the metric and the quantity associated with the metric. The base station may transmit the reporting configuration to the UE via one of RRC signaling, a MAC CE, or DCI.

In some other aspects, the base station may explicitly or implicitly transmit information to the UE that the reconfigures the UE with at least one of a metric or a set of resources that is different from that indicated in a previously transmitted reporting configuration. For example, the base station may transmit signaling to the UE that indicates a different metric from that indicated in the previously transmitted reporting configuration, but the at least one set of resources may still remain valid for reporting by the UE.

For example, referring to FIGS. 4-5, the base station 402 may transmit information indicating the metric 522 to the UE 404. In one aspect, the base station 402 may transmit the reporting configuration 524 to the UE 404, which may indicate the metric 522. In another aspect, the base station 402 may configure the at least one operational state 420 of the channel 410, which may implicitly indicate the metric 522 to the UE 404. Potentially, the base station 402 may configure the at least one operational state 420 of the channel 410 to indicate a quantity associated with the metric 522.

At 710, the base station may receive, from the UE, a report that indicates at least one value of the metric based on at least one signal of the set of signals transmitted to the UE on the channel. For example, the base station may receive the at least one value of the metric in a CSI report from the UE. In some aspects, the base station may receive the report in a configured reporting instance and/or on at least one configured reporting resource, such as at least one spatial resource (e.g., a configured beam or TCI state), time resource, and/or frequency resource.

The at least one value may correspond to at least one set of resources, such as time, frequency, and/or spatial resources. In one aspect, the at least one value may include at least two values, and each of the at least two values may correspond to a respective set of resources. In another aspect, the at least one value may include a single value that corresponds to at least two sets of resources. In other words, the at least one value may correspond to a quantity of sets of resources, which may be the same or different as the quantity indicated to the UE in the information indicating the metric. For example, the quantity associated with the at least one value received from the UE may indicate the UE preferred Tx/Rx mode.

For example, referring to FIGS. 4-5, the base station 402 may receive, from the UE 404, the report 532 indicating the at least one value 534 of the metric 522 based on at least one of the signals 526a-c transmitted to the UE 404 on the channel 410. For example, the at least one value 534 may be one value capturing the joint properties of at least two different sets of resources.

At 712, the base station may configure a MIMO scheme for communication with the UE on the channel based on the at least one value of the metric received in the report. For example, the base station may configure a TDM, FDM, and/or SDM scheme on the channel for MIMO communication with the UE. The base station may communicate with the UE (e.g., transmit downlink data and/or control information to the UE) according to the configured MIMO scheme. For example, referring to FIGS. 4-5, the base station 402 may configure 536 a MIMO scheme for MIMO communication 538 with the UE 404 on the channel 410.

Figure 8:
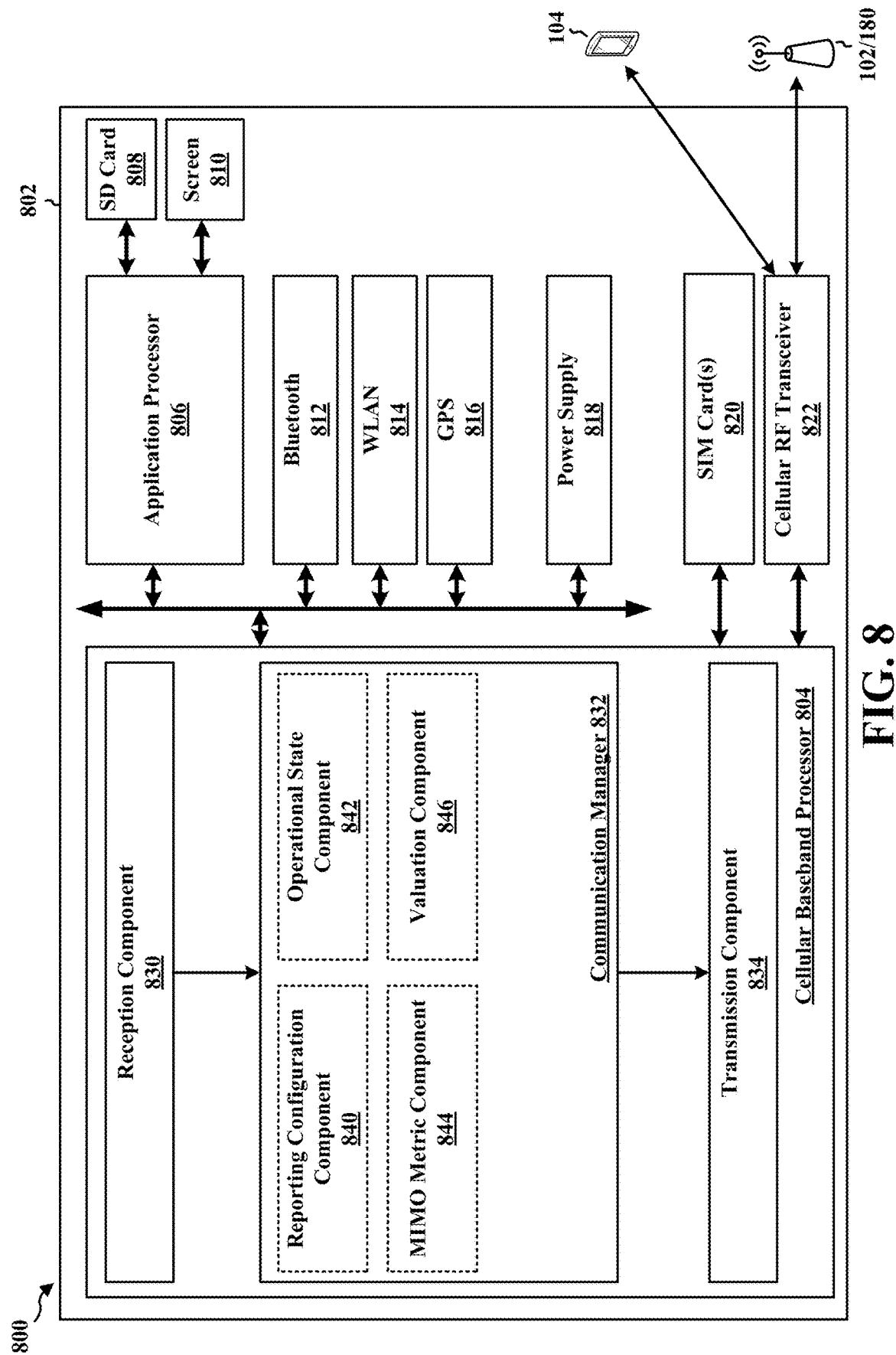
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The reception component 830 may receive each of a set of signals from the base station 102/180 on at least one channel configured with the base station 102/180, e.g., as described in connection with 602 of FIG. 6. The set of signals may include, for example, a set of SS/PBCH blocks and/or a set of CSI-RSs. In some aspects, at least one of the set of signals may be received via a single spatial domain receive filter or simultaneously received via multiple spatial domain receive filters. In some other aspects, at least one of the set of signals may be received via one of a single Rx beam of the apparatus 802 or a plurality of Rx beams of the apparatus 802. For example, at least one Rx beam of the apparatus 802 may be paired with at least one Tx beam of the base station 102/180, which may form a beam pair link, e.g., for communication on the channel 410. Potentially, multiple beam pair links may be configured between the apparatus 802 and the base station 102/180.

The reception component 830 may receive a reporting configuration from the base station 102/180, e.g., as described in connection with 604 of FIG. 6. For example, the communication manager 832 may include a reporting configuration component 840 that obtains at least one input from the reception component 830 based on the reporting configuration, and the reporting configuration component 840 may configure at least one report of at least one value of at least one metric for transmission to the base station 102/180 based on the input from the reception component 830. The reporting configuration may indicate at least one of the metric or at least one set of resources corresponding to the at least one value of the metric.

The communication manager 832 may further include an operational state component 842 that may configure an operational state of the apparatus 802, and the operational state may be associated with the at least one channel. For example, the operational state component 842 may configure the operational state of the apparatus 802 based on information received from the base station 102/180 that configures the operational state of the apparatus 802. Such information may be received from the base station 102/180 via one of RRC signaling, a MAC CE, and/or DCI.

The operational state associated with the at least one channel may include at least one of an operational SNR associated with a beam pair link (e.g., a Tx beam of the base station 102/180 paired with a Rx beam of the apparatus 802), an effective SNR associated with the at least one channel, an operational RSRP associated with the beam pair link, an effective RSRP associated with the at least one channel, one or more spatial properties of the at least one channel, a link model, a link capacity, mutual information, and/or a multiplexing scheme.

The communication manager 832 may include a MIMO metric component 844 that is configured to determine a metric associated with MIMO communication with the base station 102/180 based on at least one operational state associated with at least channel configured with the base station 102/180, e.g., as described in connection with 606 of FIG. 6. For example, the metric may include at least one of a CQI, a PMI, and/or an RI.

In some aspects, the reception component 830 may receive information from the base station 102/180 via one of RRC signaling, a MAC CE, and/or DCI, and the MIMO metric component 844 may obtain input(s) from the reception component 830 based on the information received from the base station 102/180 via the one of RRC signaling, a MAC CE, and/or DCI. The MIMO metric component 844 may determine the metric associated with MIMO communication with the base station 102/180 further based on the information received from the base station 102/180 via the one of RRC signaling, a MAC CE, and/or DCI.

In some other aspects, the MIMO metric component 844 may obtain input(s) from the operational state component 842. The MIMO metric component 844 may determine the metric associated with MIMO communication with the base station 102/180 further based on the at least one operational state, e.g., as obtained from the operational state component 842. For example, the at least one operational state may implicitly indicate the metric, and therefore, the MIMO metric component 844 may determine the metric associated with MIMO communication with the base station 102/180 further based on the implicit indication of the at least one operational state.

In some further aspects, the MIMO metric component 844 may obtain input(s) from the reporting configuration component 840. The MIMO metric component 844 may determine the metric associated with MIMO communication with the base station 102/180 further based on the reporting configuration, e.g., as obtained from the reporting configuration component 840.

The communication manager 832 may further include a valuation component 846 that obtains input(s) from the reception component 830 based on the received set of signals, and the valuation component 846 may be configured to determine at least one value of the metric based on at least one of the set of signals received from the base station 102/180 on the at least one channel, e.g., as described in connection with 608 of FIG. 6. The at least one value may correspond to at least one set of resources—e.g., at least one set of resources associated the channel. Potentially, the at least one value may correspond to at least two sets of resources.

The at least one set of resources may include at least one set of spatial resources, at least one set of time resources, and/or at least one set of frequency resources. In some aspects, the at least one set of resources may be indicated by the reporting configuration, e.g., as provided by the reporting configuration component 840.

In some aspects, the at least one value may include at least two values and the at least one set of resources may include at least two sets of resources, and each of the at least two values may correspond to a respective one of the at least two sets of resources. For example, the valuation component 846 may determine each of the at least two values, e.g., for the same metric or for a respective one of at least two metrics.

In some aspects, the determined metric may be different from another metric indicated in the reporting configuration, e.g., as provided by the reporting configuration component 840, and the at least one set of resources corresponding to the at least one value of the determined metric is different from another set of resources indicating in the reporting configuration, e.g., as provided by the reporting configuration component 840.

Illustratively, the valuation component 846 may determine a first value corresponding to a first set of resources for a CQI metric at least based on a first signal, and further, the valuation component 846 may determine a second value corresponding to a second set of resources for a CQI metric at least based on a second signal. The first and second sets of resources may be the same set of resources or may be different sets of resources, and the first and second signals may be the same signal or may be different signals.

The transmission component 834 may obtain input(s) from the valuation component 846, e.g., based on the at least one value of the metric. The transmission component 834 may be configured to transmit a report indicating the at least one value of the metric to the base station 102/180, e.g., as described in connection with 610 of FIG. 6.

The reception component 830 may be configured to receive information indicating a MIMO scheme for the MIMO communication with the base station 102/180 in response to transmitting the report indicating the at least one value of the metric, e.g., as described in connection with 612 of FIG. 6. The apparatus 802 may then communicate with the base station 102/180 based on the MIMO scheme for MIMO communication, e.g., on the at least one channel.

The apparatus may include additional components that perform some or all of the blocks of the algorithms in the aforementioned call flow diagram of FIG. 5 and/or flowchart of FIG. 6. As such, some of all of the blocks in the aforementioned call flow diagram of FIG. 5 and/or flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for determining a metric associated with MIMO communication with a base station based on at least one operational state associated with at least one channel configured with the base station; means for determining at least one value of the metric based on at least one of a set of signals received from the base station on the at least one channel, the at least one value corresponding to at least one set of resources; and means for transmitting a report indicating the at least one value of the metric to the base station.

In one aspect, the apparatus 802, and in particular the cellular baseband processor 804, may further include means for receiving a reporting configuration from the base station, and the reporting configuration indicates at least one of the metric or the at least one set of resources corresponding to the at least one value of the metric.

In one aspect, the metric is determined based on information received from the base station via one of RRC signaling, a MAC CE, or DCI. In one aspect, at least one of: the metric is different from another metric indicated in the reporting configuration, or the at least one set of resources corresponding to the at least one value of the metric is different from another set of resources indicated in the reporting configuration.

In one aspect, the apparatus 802, and in particular the cellular baseband processor 804, may further include means for receiving each of the set of signals from the base station on the at least one channel, and each of the set of signals comprises at least one of an SS/PBCH block or a CSI-RS. In one aspect, the at least one of the set of signals is received via one of a single Rx beam of the apparatus 802 or a plurality of Rx beams of the apparatus 802. In one aspect, at least one of the set of signals may be received via a single spatial domain receive filter or simultaneously received via multiple spatial domain receive filters.

In one aspect, the at least one operational state associated with the at least one channel comprises at least one of an operational SNR associated with a beam pair link, an effective SNR associated with the at least one channel, an operational RSRP associated with the beam pair link, an effective RSRP associated with the at least one channel, one or more spatial properties of the at least one channel, a link model, a link capacity, mutual information, or a multiplexing scheme. In one aspect, the at least one operational state is configured by the base station, and the metric is implicitly indicated via the at least one operational state.

In one aspect, the metric comprises at least one of a CQI, a PMI, or a RI. In one aspect, the at least one value comprises at least two values and the at least one set of resources comprises at least two sets of resources, and wherein each of the at least two values corresponds to a respective one of the at least two sets of resources. In one aspect, the at least one value comprises one value that corresponds to at least two sets of resources. In one aspect, the at least one set of resources comprises at least one set of spatial resources, time resources, or frequency resources.

In one aspect, the apparatus 802, and in particular the cellular baseband processor 804, may further include means for receiving information indicating a MIMO scheme for the MIMO communication with the base station in response to transmitting the report indicating the at least one value of the metric.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
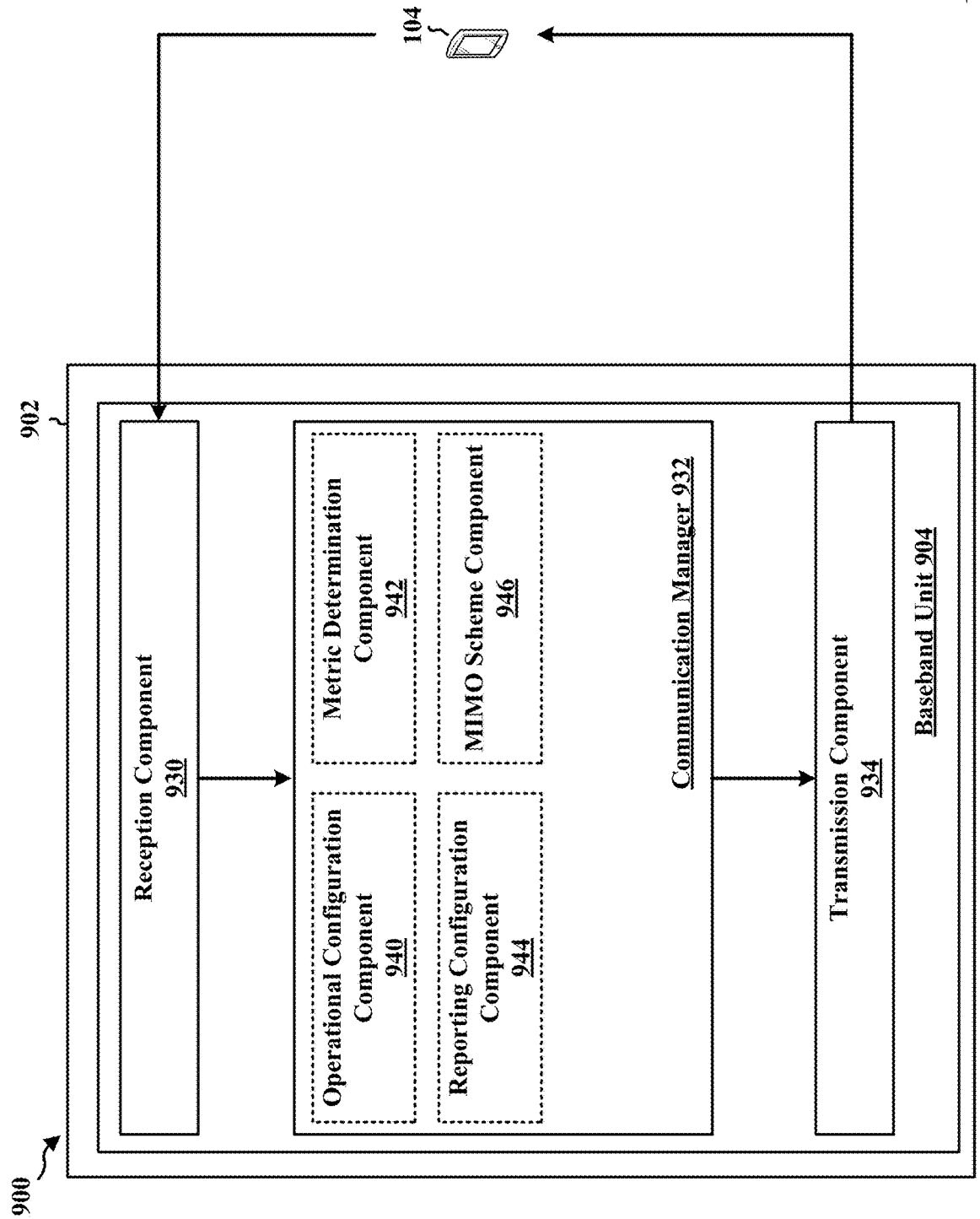
FIG. 9 is a diagram illustrating another example of a hardware implementation for another example apparatus.

FIG. 9 is a diagram 900 illustrating an example of a hardware implementation for an apparatus 902. The apparatus 902 is a BS and includes a baseband unit 904. The baseband unit 904 may communicate through a cellular RF transceiver with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the base station 310 and may include the memory 376 and/or at least one of the TX processor 316, the RX processor 370, and the controller/processor 375.

The communication manager 932 may further include an operational configuration component 940 that may configure an operational state of the UE 104. The operational state may be associated with at least one channel configured between the apparatus 902 and the UE 104. According to various aspects, the operational state associated with the at least one channel may include at least one of an operational SNR associated with a beam pair link (e.g., a Tx beam of the apparatus 902 paired with a Rx beam of the UE 104), an effective SNR associated with the at least one channel, an operational RSRP associated with the beam pair link, an effective RSRP associated with the at least one channel, one or more spatial properties of the at least one channel, a link model, a link capacity, mutual information, and/or a multiplexing scheme. The operational configuration component 940 may configure the UE 104 with the operational state by transmitting information to the UE 104, e.g., through the transmission component 934, via at least one of RRC signaling, a MAC CE, and/or DCI.

The communication manager 932 may further include a metric determination component 942 that may be configured to determine a metric associated with MIMO communication with the UE 104 based on at least one operational state associated with at least one channel configured with the UE 104, e.g., as described in connection with 702 of FIG. 7. The metric may include at least one of a CQI, a PMI, and/or an RI. The metric may correspond to at least one value of the metric (e.g., at least one CQI value(s), PMI value(s), and/or RI value(s)) to be reported by the UE 104, and the at least one value may be associated with at least one set of resources. For example, the at least one set of resources may include at least one set of spatial resources, at least one set of time resources, and/or at least one set of frequency resources.

The communication manager 932 may further include a reporting configuration component 944 that may configure reporting by the UE 104. For example, the reporting configuration component 944 may configure CSI reporting by the UE 104. The reporting configuration component 944 may provide input(s) to the transmission component 934 associated with configuring reporting by the UE 104. Accordingly, the transmission component 934 may be configured to transmit a reporting configuration to the UE 104, e.g., as described in connection with 704 of FIG. 7. According to various aspects, the reporting configuration may include information indicating at least one of the metric (e.g., associated with reporting by the UE 104) and/or at least one set of resources (e.g., corresponding to at least one value of a metric to be reported by the UE 104).

In some aspects, the metric determined by the metric determination component 942 may be different from the metric indicated in the reporting configuration configured by the reporting configuration component 944 and/or the at least one set of resources corresponding to the at least one value of the metric to be reported by the UE 104 may be different from the at least one set of resources indicated in the reporting configuration configured by the reporting configuration component 944.

The transmission component 934 may be configured to transmit each of a set of signals to the UE 104 on at least one channel, e.g., as described in connection with 706 of FIG. 7. The set of signals may include at least one of an SS/PBCH block and/or a CSI-RS.

The transmission component 934 may be further configured to transmit information indicating the metric to the UE 104, e.g., as described in connection with 708 of FIG. 7. In some aspects, the transmission component 934 may transmit the information indicating the metric to the UE 104 via at least one of RRC signaling, a MAC CE, and/or DCI. In some other aspects, the at least one operational state (e.g., with which the UE 104 is configured) may implicitly indicate the metric to the UE 104. In still other aspects, the metric may be indicated by the reporting configuration.

The reception component 930 may be configured to receive, from the UE 104, a report indicating at least one value of the metric based on at least one of the set of signals transmitted to the UE 104 on the at least one channel, e.g., as described in connection with 710 of FIG. 7. As indicated, the at least one value may correspond to at least one set of resources (e.g., time, frequency, and/or spatial resources). In some aspects, the at least one value includes at least two values and the at least one set of resources includes at least two sets of resources, and each of the at least two values corresponds to a respective one of the at least two sets of resources. In some other aspects, the at least one value includes one value that corresponds to at least two sets of resources. The report received from the UE 104 may be based on the reporting configuration transmitted to the UE 104.

The communication manager 932 may further include a component a MIMO scheme component 946 that obtains input(s) from the reception component 930 based on the at least one value of the metric corresponding to the at least one set of resources. The MIMO scheme component 946 may configure a MIMO scheme for MIMO communication with the UE 104 based on the at least one value of the metric, e.g., as described in connection with 712 of FIG. 7. For example, the transmission component 934 may obtain input(s) from the MIMO scheme component 946 based on the configured MIMO scheme, and the transmission component 934 may transmit information to the UE 104 that configures the UE 104 with the MIMO scheme for MIMO communication with the apparatus 902. The apparatus 902 may then communicate with the UE 104 based on the MIMO scheme for MIMO communication, e.g., on the at least one channel.

The apparatus may include additional components that perform some or all of the blocks of the algorithms in the aforementioned call flow diagram of FIG. 5 and/or flowchart of FIG. 7. As such, some of all of the blocks in the aforementioned call flow diagram of FIG. 5 and/or flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for determining a metric associated with MIMO communication with a UE based on at least one operational state associated with at least one channel configured with the UE; means for transmitting information indicating the metric to the UE; and means for receiving, from the UE, a report indicating at least one value of the metric based on at least one of a set of signals transmitted to the UE on the at least one channel, the at least one value corresponding to at least one set of resources.

In one aspect, the apparatus 902, and in particular the baseband unit 904, may further include means for transmitting a reporting configuration to the UE, and the reporting configuration indicates at least one of the metric or the at least one set of resources corresponding to the at least one value of the metric.

In one aspect, at least one of: the metric is different from another metric indicated in the reporting configuration, or the at least one set of resources corresponding to the at least one value of the metric is different from another set of resources indicated in the reporting configuration. In one aspect, the information indicating the metric is transmitted via one of RRC signaling, a MAC CE, or DCI.

In one aspect, the apparatus 902, and in particular the baseband unit 904, may further include means for transmitting each of the set of signals to the UE on the at least one channel, and each of the set of signals comprises at least one of a SS/PBCH block or a CSI-RS.

In one aspect, the at least one operational state associated with the at least one channel comprises at least one of an operational SNR associated with a beam pair link, an effective SNR associated with the at least one channel, an operational RSRP associated with the beam pair link, an effective RSRP associated with the at least one channel, one or more spatial properties of the at least one channel, a link model, a link capacity, mutual information, or a multiplexing scheme.

In one aspect, the at least one operational state is configured by the base station, and the at least one operational state implicitly indicates the metric. In one aspect, the metric comprises at least one of a CQI, a PMI, or a RI.

In one aspect, the at least one value comprises at least two values and the at least one set of resources comprises at least two sets of resources, and wherein each of the at least two values corresponds to a respective one of the at least two sets of resources. In one aspect, the at least one value comprises one value that corresponds to at least two sets of resources. In one aspect, the at least one set of resources comprises at least one set of spatial resources, time resources, or frequency resources.

In one aspect, the apparatus 902, and in particular the baseband unit 904, may further include means for configuring a MIMO scheme for the MIMO communication with the UE based on the at least one value of the metric.

The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 may be a UE configured to determine a metric associated with MIMO communication with a base station based on at least one operational state associated with at least one channel configured with the base station; determine at least one value of the metric based on at least one of a set of signals received from the base station on the at least one channel, the at least one value corresponding to at least one set of resources; and transmit a report indicating the at least one value of the metric to the base station.

Example 2 may be the UE of Example 1, and further configured to receive a reporting configuration from the base station, and the reporting configuration indicates at least one of the metric or the at least one set of resources corresponding to the at least one value of the metric.

Example 3 may be the UE of Example 2, and the metric is determined based on information received from the base station via one of RRC signaling, a MAC CE, or DCI.

Example 4 may be the UE of any of Examples 2 and 3, and the metric is different from another metric indicated in the reporting configuration, or the at least one set of resources corresponding to the at least one value of the metric is different from another set of resources indicated in the reporting configuration.

Example 5 may be the UE of any of Examples 1 through 4, further configured to receive each of the set of signals from the base station on the at least one channel, and each of the set of signals comprises at least one of a SS/PBCH block or a CSI-RS.

Example 6 may be the UE of Example 5, and the at least one of the set of signals is received via one of a single receive beam of the UE or a plurality of receive beams of the UE.

Example 7 may be the UE of Example 5, and the at least one of the set of signals may be received via a single spatial domain receive filter or simultaneously received via multiple spatial domain receive filters.

Example 8 may be the UE of any of Examples 1 through 7, and the at least one operational state associated with the at least one channel comprises at least one of an operational SNR associated with a beam pair link, an effective SNR associated with the at least one channel, an operational RSRP associated with the beam pair link, an effective RSRP associated with the at least one channel, one or more spatial properties of the at least one channel, a link model, a link capacity, mutual information, or a multiplexing scheme.

Example 9 may be the UE of any of Examples 1 through 8, and the at least one operational state is configured by the base station, and the metric is implicitly indicated via the at least one operational state.

Example 10 may be the UE of any of Examples 1 through 9, and the metric comprises at least one of a CQI, a PMI, or a RI.

Example 11 may be the UE of any of Examples 1 through 10, and the at least one value comprises at least two values and the at least one set of resources comprises at least two sets of resources, and wherein each of the at least two values corresponds to a respective one of the at least two sets of resources.

Example 12 may be the UE of any of Examples 1 through 10, and the at least one value comprises one value that corresponds to at least two sets of resources.

Example 13 may be the UE of any of Examples 1 through 12, and the at least one set of resources comprises at least one set of spatial resources, time resources, or frequency resources.

Example 14 may be the UE of any of Examples 1 through 13, further configured to receive information indicating a MIMO scheme for the MIMO communication with the base station in response to transmitting the report indicating the at least one value of the metric.

Example 15 may be a base station configured to determine a metric associated with MIMO communication with a UE based on at least one operational state associated with at least one channel configured with the UE; transmit information indicating the metric to the UE; and receive, from the UE, a report indicating at least one value of the metric based on at least one of a set of signals transmitted to the UE on the at least one channel, the at least one value corresponding to at least one set of resources.

Example 16 may be the base station of Example 15, further configured to transmit a reporting configuration to the UE, and the reporting configuration includes information indicating at least one of the metric or the at least one set of resources corresponding to the at least one value of the metric.

Example 17 may be the base station of Example 16, and the information indicating the metric is transmitted via one of RRC signaling, a MAC CE, or DCI.

Example 18 may be the base station of any of Example 16 and 17, and at least one of: the metric is different from another metric indicated in the reporting configuration, or the at least one set of resources corresponding to the at least one value of the metric is different from another set of resources indicated in the reporting configuration.

Example 19 may be the base station of any of Example 15 through 18, further configured to transmit each of the set of signals to the UE on the at least one channel, and each of the set of signals comprises at least one of a SS/PBCH block or a CSI-RS.

Example 20 may be the base station of any of Example 15 through 19, and the at least one operational state associated with the at least one channel comprises at least one of an operational SNR associated with a beam pair link, an effective SNR associated with the at least one channel, an operational RSRP associated with the beam pair link, an effective RSRP associated with the at least one channel, one or more spatial properties of the at least one channel, a link model, a link capacity, mutual information, or a multiplexing scheme.

Example 21 may be the base station of any of Example 15 through 20, and the at least one operational state is configured by the base station, and the at least one operational state implicitly indicates the metric.

Example 22 may be the base station of any of Example 15 through 21, and the metric comprises at least one of a CQI, a PMI, or a RI.

Example 23 may be the base station of any of Example 15 through 22, and the at least one value comprises at least two values and the at least one set of resources comprises at least two sets of resources, and wherein each of the at least two values corresponds to a respective one of the at least two sets of resources.

Example 24 may be the base station of any of Example 15 through 22, and the at least one value comprises one value that corresponds to at least two sets of resources.

Example 25 may be the base station of any of Example 15 through 24, and the at least one set of resources comprises at least one set of spatial resources, time resources, or frequency resources.

Example 26 may be the base station of any of Example 15 through 25, further configured to configure a MIMO scheme for the MIMO communication with the UE based on the at least one value of the metric.

What is claimed is:

1. A method of wireless communication by a user equipment (UE), the method comprising:
   receiving, from a base station, an indication of a metric associated with multiple-input multiple-output (MIMO) communication and a reporting configuration, the indication of the metric indicating which metric, selected from a set of metrics, is to be reported to the base station, wherein the metric is selected based on at least one operational state associated with a joint channel with the base station, the reporting configuration indicating at least one of the metric or at least one set of resources corresponding to at least one value of the metric;
   determining the at least one value of the metric based on at least one of a set of signals received from the base station on the joint channel, the at least one value corresponding to at least one set of resources of the joint channel; and
   transmitting a report indicating the at least one value of the metric to the base station.

2. The method of claim 1, wherein the indication of the metric is received via at least one of radio resource control (RRC) signaling, a media access control (MAC) control element (CE), or downlink control information (DCI).

3. The method of claim 1, further comprising:
   receiving each of the set of signals from the base station on the joint channel,
   wherein each of the set of signals comprises at least one of a synchronization signal (SS)/physical broadcast channel (PBCH) block or a channel state information reference signal (CSI-RS).

4. The method of claim 3, wherein the at least one of the set of signals is received via one of a single receive beam of the UE or a plurality of receive beams of the UE.

5. The method of claim 3, wherein the at least one of the set of signals may be received via a single spatial domain receive filter or simultaneously received via multiple spatial domain receive filters.

6. The method of claim 1, wherein the at least one operational state associated with the joint channel comprises at least one of an operational signal-to-noise ratio (SNR) associated with a beam pair link, an effective SNR associated with the joint channel, an operational reference signal receive power (RSRP) associated with the beam pair link, an effective RSRP associated with the joint channel, one or more spatial properties of the joint channel, a link model, a link capacity, mutual information, or a multiplexing scheme.

7. The method of claim 1, wherein the at least one operational state is configured by the base station, and the metric is implicitly indicated via the at least one operational state.

8. The method of claim 1, wherein the metric comprises at least one of a channel quality indicator (CQI), a precoding matrix indicator (PMI), or a rank indicator (RI).

9. The method of claim 1, wherein the at least one set of resources of the joint channel comprises at least one set of spatial resources, time resources, or frequency resources.

10. The method of claim 1, further comprising:
    receiving information indicating a MIMO scheme for the MIMO communication with the base station in response to transmitting the report indicating the at least one value of the metric.

11. A method of wireless communication by a base station, the method comprising:
    selecting, from a set of metrics and based on at least one operational state associated with a joint channel with a user equipment (UE), a metric associated with multiple-input multiple-output (MIMO) communication that is to be reported by the UE and a reporting configuration indicating at least one of the metric or at least one set of resources corresponding to at least one value of the metric;
    transmitting information indicating the metric and the reporting configuration to the UE; and
    receiving, from the UE, a report indicating the at least one value of the metric that is selected based on at least one of a set of signals transmitted to the UE on the joint channel, the at least one value corresponding to at least one set of resources of the joint channel, the report being in accordance with the reporting configuration.

12. The method of claim 11, wherein the information indicating the metric is transmitted via one of radio resource control (RRC) signaling, a media access control (MAC) control element (CE), or downlink control information (DCI).

13. The method of claim 11, further comprising:
transmitting each of the set of signals to the UE on the joint channel,
wherein each of the set of signals comprises at least one of a synchronization signal (SS)/physical broadcast channel (PBCH) block or a channel state information reference signal (CSI-RS).

14. The method of claim 11, wherein the at least one operational state associated with the joint channel comprises at least one of an operational signal-to-noise ratio (SNR) associated with a beam pair link, an effective SNR associated with the joint channel, an operational reference signal receive power (RSRP) associated with the beam pair link, an effective RSRP associated with the joint channel, one or more spatial properties of the joint channel, a link model, a link capacity, mutual information, or a multiplexing scheme.

15. The method of claim 11, wherein the at least one operational state is configured by the base station, and the at least one operational state implicitly indicates the metric.

16. The method of claim 11, wherein the metric comprises at least one of a channel quality indicator (CQI), a precoding matrix indicator (PMI), or a rank indicator (RI).

17. The method of claim 11, wherein the at least one set of resources of the joint channel comprises at least one set of spatial resources, time resources, or frequency resources.

18. The method of claim 11, further comprising:
configuring a MIMO scheme for the MIMO communication with the UE based on the at least one value of the metric.

19. An apparatus for wireless communication by a user equipment (UE), the apparatus comprising:
a memory; and
at least one processor coupled to the memory and configured to:
receive, from a base station, an indication of a metric associated with multiple-input multiple-output (MIMO) communication and a reporting configuration, the indication of the metric indicating which metric, selected from a set of metrics, is to be reported to the base station, wherein the metric is selected based on at least one operational state associated with a joint channel with the base station, the reporting configuration indicating at least one of the metric or at least one set of resources corresponding to at least one value of the metric;
determine the at least one value of the metric based on at least one of a set of signals received from the base station on the joint channel, the at least one value corresponding to at least one set of resources of the joint channel; and
transmit a report indicating the at least one value of the metric to the base station.

20. The apparatus of claim 19, wherein the at least one processor is further configured to:
receiving each of the set of signals from the base station on the joint channel,
wherein each of the set of signals comprises at least one of a synchronization signal (SS)/physical broadcast channel (PBCH) block or a channel state information reference signal (CSI-RS).

21. The apparatus of claim 19, wherein the at least one operational state associated with the joint channel comprises at least one of an operational signal-to-noise ratio (SNR) associated with a beam pair link, an effective SNR associated with the joint channel, an operational reference signal receive power (RSRP) associated with the beam pair link, an effective RSRP associated with the joint channel, one or more spatial properties of the joint channel, a link model, a link capacity, mutual information, or a multiplexing scheme.

22. The apparatus of claim 19, wherein the at least one processor is further configured to:
receive information indicating a MIMO scheme for the MIMO communication with the base station in response to transmission of the report indicating the at least one value of the metric.

23. The apparatus of claim 19, wherein the indication of the metric is transmitted via at least one of radio resource control (RRC) signaling, a media access control (MAC) control element (CE), or downlink control information (DCI).

24. The apparatus of claim 19, wherein the at least one operational state is configured by the base station, and the metric is implicitly indicated via the at least one operational state.

25. An apparatus for wireless communication by a base station, the apparatus comprising:
a memory; and
at least one processor coupled to the memory and configured to:
select, from a set of metrics and based on at least one operational state associated with a joint channel with a user equipment (UE), a metric associated with multiple-input multiple-output (MIMO) communication that is to be reported by the UE and a reporting configuration indicating at least one of the metric or at least one set of resources corresponding to at least one value of the metric;
transmit information indicating the metric and the reporting configuration to the UE; and
receive, from the UE, a report indicating the at least one value of the metric that is selected based on at least one of a set of signals transmitted to the UE on the joint channel, the at least one value corresponding to at least one set of resources of the joint channel, the report being in accordance with the reporting configuration.

26. The apparatus of claim 25, wherein the at least one processor is further configured to:
transmit each of the set of signals to the UE on the joint channel,
wherein each of the set of signals comprises at least one of a synchronization signal (SS)/physical broadcast channel (PBCH) block or a channel state information reference signal (CSI-RS).

27. The apparatus of claim 25, wherein the at least one operational state associated with the joint channel comprises at least one of an operational signal-to-noise ratio (SNR) associated with a beam pair link, an effective SNR associated with the joint channel, an operational reference signal receive power (RSRP) associated with the beam pair link, an effective RSRP associated with the joint channel, one or more spatial properties of the joint channel, a link model, a link capacity, mutual information, or a multiplexing scheme.

28. The apparatus of claim 25, wherein the at least one processor is further configured to:
configure a MIMO scheme for the MIMO communication with the UE based on the at least one value of the metric.

29. The apparatus of claim 25, wherein the information indicating the metric is transmitted via one of radio resource control (RRC) signaling, a media access control (MAC) control element (CE), or downlink control information (DCI).

30. The apparatus of claim 25, wherein the at least one operational state is configured by the base station, and the metric is implicitly indicated via the at least one operational state.

\* \* \* \* \*